US010697150B2

(12) United States Patent
Takahashi et al.

(10) Patent No.: US 10,697,150 B2
(45) Date of Patent: Jun. 30, 2020

(54) HYDRAULIC DRIVE SYSTEM FOR ELECTRICALLY-DRIVEN HYDRAULIC WORK MACHINE

(71) Applicant: Hitachi Construction Machinery Tierra Co., Ltd., Koka-shi, Shiga (JP)

(72) Inventors: Kiwamu Takahashi, Moriyama (JP); Tatsuo Takishita, Koka (JP); Masayuki Yunoue, Koka (JP); Kenichirou Nakatani, Kusatsu (JP); Taihei Maehara, Koka (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 0 days.

(21) Appl. No.: 16/327,115

(22) PCT Filed: Mar. 13, 2018

(86) PCT No.: PCT/JP2018/009830
§ 371 (c)(1),
(2) Date: Feb. 21, 2019

(87) PCT Pub. No.: WO2018/168887
PCT Pub. Date: Sep. 20, 2018

(65) Prior Publication Data
US 2019/0194910 A1 Jun. 27, 2019

(30) Foreign Application Priority Data

Mar. 13, 2017 (JP) .................................. 2017-047817

(51) Int. Cl.
*F15B 11/16* (2006.01)
*E02F 9/22* (2006.01)
(Continued)

(52) U.S. Cl.
CPC .............. *E02F 9/2242* (2013.01); *E02F 9/20* (2013.01); *E02F 9/2004* (2013.01); *E02F 9/22* (2013.01);
(Continued)

(58) Field of Classification Search
CPC ............................... F15B 11/17; E02F 9/2292
See application file for complete search history.

(56) References Cited

U.S. PATENT DOCUMENTS 6,989,640 B2 * 1/2006 Yoshimatsu .......... E02F 9/2075
318/34
7,059,125 B2 * 6/2006 Oka ....................... E02F 9/2235
60/422

(Continued)

FOREIGN PATENT DOCUMENTS

JP 2003-155760 A 5/2003
JP 2005-83427 A 3/2005
(Continued)

OTHER PUBLICATIONS

International Preliminary Report on Patentability (PCT/IB/338 & PCT/IB/373) issued in PCT Application No. PCT/JP2018/009830 dated Sep. 26, 2019, including English translation of document C2 (Japanese-language Written Opinion (PCT/ISA/237 previously filed on Feb. 21, 2019)) (six (6) pages).

(Continued)

*Primary Examiner* — Thomas E Lazo
(74) *Attorney, Agent, or Firm* — Crowell & Moring LLP

(57) ABSTRACT

A hydraulic drive system for an electrically-driven hydraulic work machine makes it possible to make a rated voltage of various electric equipment such as power storage devices common to one of an electrically-driven hydraulic work machine that is capable of being operated with lower horsepower and to prevent that only a power storage situation of
(Continued)

one of the plurality of power storage devices significantly degrades together with operation of the electrically-driven hydraulic work machine and besides, to extend a time period within which each of actuators of the electrically-driven hydraulic work machine can obtain a predetermined speed. Accordingly, a controller 50 includes a virtual limitation torque calculation section 51 and electric motor rotational speed control sections 52 and 53. Variable horsepower control tables 52*r* and 53*r* are provided in the electric motor rotational speed control sections 52 and 53, and limit values q1*limit and q2*limit for a virtual displacement of the variable horsepower control tables 52*r* and 53*r* are changed such that a charge state of a power storage device 170 and a charge state of another power storage device 270 become equal to each other.

8 Claims, 18 Drawing Sheets

(51) Int. Cl.
*E02F 9/20* (2006.01)
*F15B 11/17* (2006.01)
*F15B 11/00* (2006.01)
*E02F 3/32* (2006.01)

(52) U.S. Cl.
CPC .......... *E02F 9/2235* (2013.01); *E02F 9/2267* (2013.01); *E02F 9/2271* (2013.01); *E02F 9/2285* (2013.01); *E02F 9/2292* (2013.01); *E02F 9/2296* (2013.01); *F15B 11/00* (2013.01); *F15B 11/161* (2013.01); *F15B 11/17* (2013.01); *E02F 3/325* (2013.01); *F15B 2211/20515* (2013.01); *F15B 2211/20538* (2013.01); *F15B 2211/20546* (2013.01); *F15B 2211/20576* (2013.01); *F15B 2211/253* (2013.01); *F15B 2211/255* (2013.01); *F15B 2211/275* (2013.01); *F15B 2211/575* (2013.01); *F15B 2211/605* (2013.01); *F15B 2211/6309* (2013.01); *F15B 2211/6313* (2013.01); *F15B 2211/6346* (2013.01); *F15B 2211/6651* (2013.01); *F15B 2211/7053* (2013.01); *F15B 2211/7058* (2013.01); *F15B 2211/71* (2013.01); *F15B 2211/7135* (2013.01)

(56) References Cited

U.S. PATENT DOCUMENTS

| | | |
|---|---|---|
| 2005/0001567 A1 | 1/2005 | Yoshimatsu |
| 2005/0001593 A1* | 1/2005 | Kawasumi ............ H02J 7/0071 320/132 |
| 2005/0060993 A1 | 3/2005 | Oka et al. |
| 2010/0096918 A1 | 4/2010 | Sawada et al. |
| 2014/0117934 A1* | 5/2014 | Kurikuma ............... B60L 58/13 320/109 |
| 2014/0227104 A1 | 8/2014 | Takahashi et al. |

FOREIGN PATENT DOCUMENTS

| | | |
|---|---|---|
| JP | 2008-109840 A | 5/2008 |
| JP | 2008-256037 A | 10/2008 |
| JP | 2015-198495 A | 11/2015 |
| WO | WO 2013/058326 A1 | 4/2013 |

OTHER PUBLICATIONS

International Search Report (PCT/ISA/210) issued in PCT Application No. PCT/JP2018/009830 dated May 22, 2018 with English translation (five pages).
Japanese-language Written Opinion (PCT/ISA/237) issued in PCT Application No. PCT/JP2018/009830 dated May 22, 2018 (three pages).
Korean-language Office Action issued in Korean Application No. 10-2019-7003923 dated Mar. 10, 2020 (six (6) pages).

* cited by examiner

HYDRAULIC DRIVE SYSTEM FOR ELECTRICALLY-DRIVEN HYDRAULIC WORK MACHINE

TECHNICAL FIELD

The present invention relates to a hydraulic drive system for an electrically-driven hydraulic work machine such as a hydraulic excavator in which a hydraulic pump is driven by an electric motor to drive actuators to perform various works, and particularly to the hydraulic drive system that controls a rotational speed of an electric motor for driving the hydraulic pump such that absorption torque of the hydraulic pump becomes equal to or lower than a certain value, thereby to perform so-called horsepower control.

BACKGROUND ART

A conventional technology of an electrically-driven hydraulic work machine such as a hydraulic excavator in which a hydraulic pump is driven by an electric motor to drive actuators to perform various works is disclosed in Patent Document 1 and Patent Document 2.

According to Patent Document 1, a configuration is proposed in which a hydraulic pump of fixed displacement type driven by an electric motor is provided and the rotational speed of the electric motor is controlled such that a differential pressure between a delivery pressure of the hydraulic pump and a maximum load pressure of a plurality of actuators is fixed to perform load sensing control. If this technology is used, then the number of hydraulic pipes can be decreased from that, in an alternative case in which the load sensing control is performed using a hydraulic pump of variable displacement type, and it is facilitated to apply high-efficiency load sensing control to a small-sized hydraulic excavator or the like in which the necessary installation space is small.

Meanwhile, according to Patent Document 2, an electrically-driven hydraulic work machine is proposed in which a hydraulic pump is configured as that of the variable displacement type including only a horsepower controlling function and a controlling algorism that simulates a horsepower control characteristic of a hydraulic pump of the variable displacement type is provided in a controller for controlling the rotational speed of an electric motor. If this technology is used, then a power storage device that is a power source for the electric motor can be made long-lasting and besides, the electric motor can be downsized in addition to the advantages of Patent Document 1.

PRIOR ART DOCUMENT

Patent Document

Patent Document 1: JP-2008-256037-A
Patent Document 2: WO 2013/058326

SUMMARY OF THE INVENTION

Problem to be Solved by the Invention

However, also in the case where the conventional technologies disclosed in Patent Document 1 and Patent Document 2 are used, there is such a problem as described below.

In general, if horsepower required for an electrically-driven hydraulic work machine increases, also an electric motor having high rated output power must be selected in response to the increase of the horsepower. However, if the rated output power of the electric motor increases, then there is a case in which the rated voltage becomes high in order to avoid current that flows in the electric motor and an inverter, which is a controlling circuit for the electric motor, from becoming high (for example, while the rated voltage where the rated output power is 20 kW is 200 V, the rated voltage where the rated output power is 40 kW is 400 V).

In this case, the rated voltage of a power storage device or the rated voltage of a step-up/step-down chopper cannot be made common to that of the electrically-driven hydraulic work machine that is capable of being operated with lower horsepower and it is necessary to set rated voltages of a power storage device and a step-up/step-down chopper for exclusive use, and this is cumbersome.

As a countermeasure for avoidance of the cumbersomeness, it is conceivable to provide a plurality of systems of a hydraulic pump, an electric motor, an inverter, a step-up/step-down chopper, a power storage device, and so forth in parallel to one another such that hydraulic fluids delivered from the plurality of systems of the pumps are merged and supplied to a plurality of flow control valves for controlling hydraulic supplied to fluids to the actuators.

According to the countermeasure, since hydraulic fluids delivered from the hydraulic pumps of the plurality of systems are merged, the actuators can be operated at a predetermined speed, and the rated voltage of the power storage device or the rated voltage of the step-up/step-down chopper can be made common to that of the electrically-driven hydraulic work machine that is capable of being operated with lower horsepower.

However, also in the case where such a configuration as described above is adopted, there is a problem in the following cases.

First, since a plurality of systems of a hydraulic pump, an electric motor, an inverter, a step-up/step-down chopper, and a power storage device are provided in parallel to one another, even in the case where the plurality of systems of the hydraulic pumps have same specifications and generate equal power, a small difference sometimes occurs in electric power consumption of the power storage devices due to the machine efficiency of the plurality of systems of the hydraulic pumps, efficiencies of the inverters and step-up/step-down choppers, and so forth.

Second, although the power storage device is in most cases configured normally by connecting a plurality of cells in series, voltages of the cells have some dispersion, and the voltage of a cell whose voltage decreases most from among the plurality of cells has a strong influence on the charge state (=SOC (State of Charge)) of the power storage device. Therefore, in the case where a plurality of systems of power storage devices are provided as described above, even if the plurality of systems of power storage devices should consume fully equal electric power, a different SOC is sometimes indicated due to a difference in dispersion of the voltages of the plurality of cells configuring each of the plurality of systems of power storage devices.

In such first and second cases as described above, when the electrically-driven hydraulic work machine is continuously operated, unbalance occurs in the SOC of the plurality of systems of power storage devices described above and, as a result, the SOC of one of the power storage devices becomes lower than a minimum usable level earlier, which disables the power storage device, in some cases.

In such a case as just described, there is a problem that one of the plurality of systems of power storage devices is disabled and the hydraulic pump that has been driven by an electric motor to which electric power has been supplied by the disabled power storage device stops the supply of hydraulic fluid, which significantly decreases the actuator speed of each of the actuators of the hydraulic work machine and hence the workability of the hydraulic work machine.

It is an object of the present invention to provide a hydraulic drive system for an electrically-driven hydraulic work machine in which a plurality of power storage devices, a plurality of electric motors, and a plurality of hydraulic pumps are provided in parallel to one another such that the rated voltage of each of various electric equipment such as power storage devices can be made common to that of an electrically-driven hydraulic work machine that is capable of being operated with lower horsepower and it is prevented that only the power storage situation of one of the plurality of power storage devices significantly degrades together with operation of the electrically-driven hydraulic work machine and besides, the time period within which each of the actuators of the electrically-driven hydraulic work machine can obtain a predetermined speed can be extended.

Means for Solving the Problem

In order to solve the problems described above, according to the present invention, a hydraulic drive system for an electrically-driven hydraulic work machine including a first hydraulic pump, a plurality of actuators driven by hydraulic fluid supplied from the first hydraulic pump, a plurality of flow control valves that control directions and flow rates of the hydraulic fluids to be supplied to the plurality of actuators, a first electric motor that drives the first hydraulic pump, a first power storage device for supplying electric power to the first electric motor, and a first horsepower control device configured to decrease, when a delivery pressure of the first hydraulic pump increases, a delivery flow rate of the first hydraulic pump to control an absorption horsepower of the first hydraulic pump so as not to exceed a first allowable value, the hydraulic drive system comprising a second hydraulic pump, a common hydraulic fluid supply line in which hydraulic fluids delivered from the first and second hydraulic pumps are merged and are supplied to the plurality of flow control valves, a second electric motor that drives the second hydraulic pump, a second power storage device that supplies electric power to the second electric motor, a second horsepower control device configured to decreases, when a delivery pressure of the second hydraulic pump increases, a delivery flow rate of the second hydraulic pump to control an absorption horsepower of the second hydraulic pump so as not to exceed a second allowable value, and a controller including a horsepower distribution control section configured to change at least one of the first and second allowable values of the first and second horsepower control devices such that a charge state of the first power storage device and a charge state of the second power storage device become equal to each other.

Since the second hydraulic pump, second electric motor, second power storage device, and the common hydraulic fluid supply line in which hydraulic fluids delivered from the first and second hydraulic pumps are merged are provided in addition to the first hydraulic pump, first electric motor, and first power storage device such that the merged hydraulic fluids are supplied to the plurality of flow control valves and then are further supplied to the plurality of actuators in such a manner as described above, the rated voltage of various electric equipment such as the power storage devices can be made common to that of an electrically-driven hydraulic work machine that is capable of being operated with lower horse power.

Further, by providing the controller including the horsepower distribution control section that changes at least one of the first and second allowable values of the first and second horsepower control devices such that the charge state of the first power storage device and the charge state of the second power storage device become equal to each other, even in the case where there is a difference between machine efficiencies of the first and second hydraulic pumps (plurality of hydraulic pumps) or in efficiency of electric equipment such as inverters or step-up/step-down choppers that control the rotational speed of the plurality of electric motors for individually driving the plurality of hydraulic pumps or even in the case where there is a difference in electric power consumption amount or charge state characteristic of the plurality of power storage devices, the difference gradually decrease while the charge states of the plurality of power storage devices are controlled so as to become equal to each other. Therefore, it is prevented that the power storage situation of only one of the plurality of power storage devices significantly degrades, and the time period within which each of the actuators of the electrically-driven hydraulic work machine obtain a predetermined speed can be extended.

Effect of the Invention

According to the present invention, the rated voltage of each of various electric equipment such as a power storage device can be made common to that of an electrically-driven hydraulic work machine that is capable of being operated with lower horsepower.

Further, according to the present invention, the time period within which each of the actuators of the electrically-driven hydraulic work machine obtains a predetermined speed can be extended.

MODES FOR CARRYING OUT THE INVENTION

In the following, embodiments of the present invention are described with reference to the drawings.

First Embodiment

—Structure—

Figure 1:
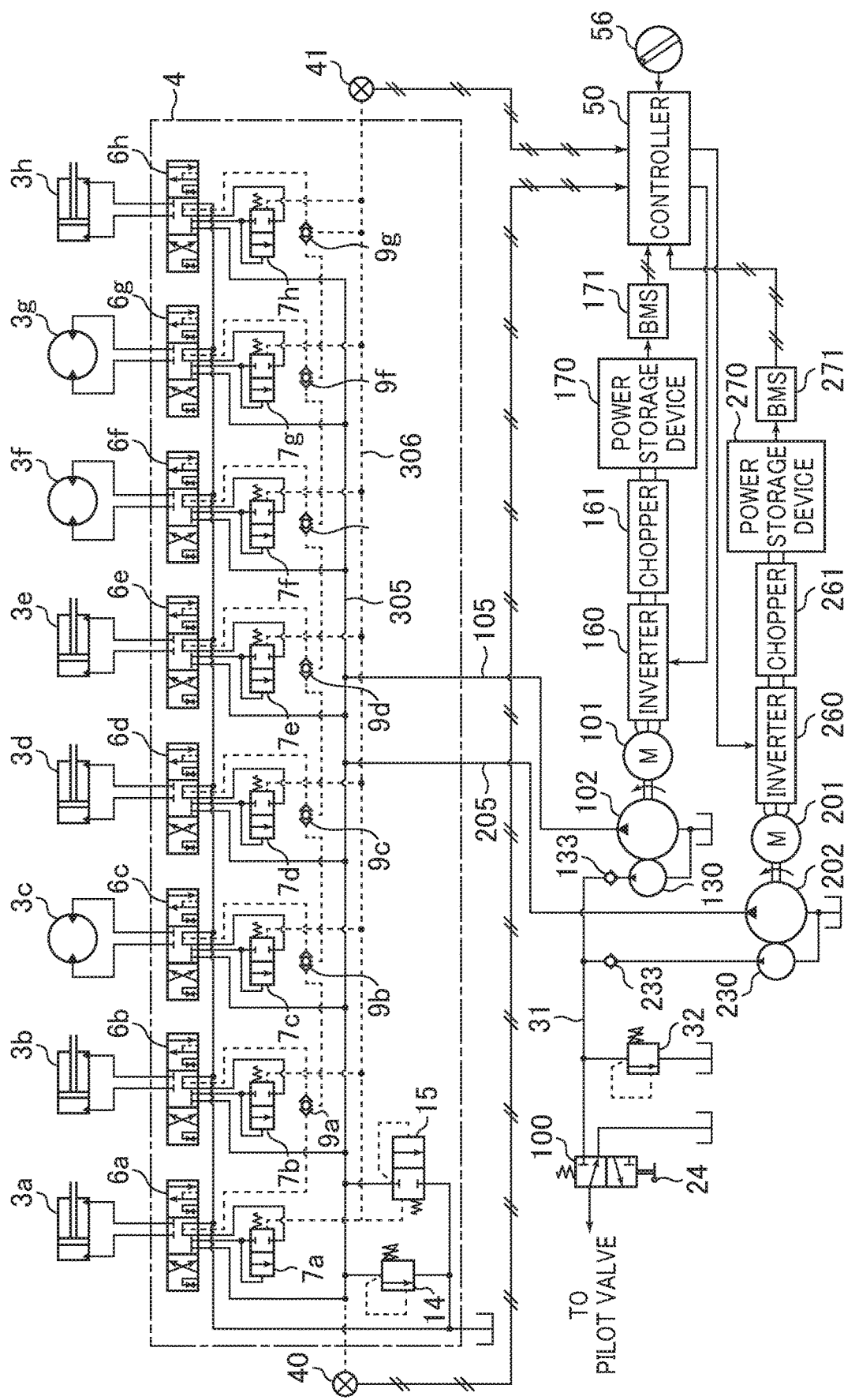
FIG. 1 is a view depicting a hydraulic drive system for an electrically-driven hydraulic work machine according to a first embodiment of the present invention.

FIG. 1 is a view depicting a hydraulic drive system for an electrically-driven hydraulic work machine (hydraulic excavator) according to a first embodiment of the present invention.

The hydraulic drive system of the present embodiment includes electric motors 101 and 201 (first and second electric motors), main pumps 102 and 202 (first and second hydraulic pumps) of fixed displacement type driven by the electric motors 101 and 201, respectively, pilot pumps 130 and 230 of fixed displacement type, a boom cylinder 3a, an arm cylinder 3b, a swing motor 3c, a bucket cylinder 3d, a swing cylinder 3e, travel motors 3f and 3g, and a blade cylinder 3h that are a plurality of actuators driven by hydraulic fluids delivered from the main pumps 102 and 202 of the fixed displacement type, hydraulic fluid supply lines 105 and 205 that introduce hydraulic fluids delivered from the main pumps 102 and 202 of the fixed displacement type to the plurality of actuators 3a, 3b, 3c, 3d, 3e, 3f, 3g and 3h, and a control valve block 4 that is provided on the downstream of the hydraulic fluid supply lines 105 and 205 and to which hydraulic fluids delivered from the main pumps 102 and 202 of the fixed displacement type are introduced.

The control valve block 4 includes a common hydraulic fluid supply line 305 that is connected to the hydraulic fluid supply lines 105 and 205 and in which hydraulic fluids delivered from the main pumps 102 and 202 are merged, a plurality of flow control valves 6a, 6b, 6c, 6d, 6e, 6f, 6g, and 6h that are connected to the common hydraulic fluid supply line 305 and control a direction and a flow rate of hydraulic fluid to be supplied from the common hydraulic fluid supply line 305 to each of the plurality of actuators 3a, 3b, 3c, 3d, 3e, 3f, 3g, and 3h, pressure compensating valves 7a, 7b, 7c, 7d, 7e, 7f, 7g, and 7h that respectively control differential pressures across the plurality of flow control valves 6a, 6b, 6c, 6d, 6e, 6f, 6g, and 6h, a main relief valve 14 that is provided in the common hydraulic fluid supply line 305 and controls a pressure of the common hydraulic fluid supply line 305 so as not to become equal to or higher than a set pressure, shuttle valves 9a, 9b, 9c, 9d, 9e, 9f, and 9g that are each connected to a load port of each of the plurality of flow control valves 6a, 6b, 6c, 6d, 6e, 6f, 6g, and 6h and detects a highest load pressure Plmax of the plurality of actuators 3a, 3b, 3c, 3d, 3e, 3f, 3g, and 3h and outputs the detected highest load pressure Plmax to a highest load hydraulic fluid line 306, and an unload valve 15 that is connected to the common hydraulic fluid supply line 305 and selects, when the pressure of the common hydraulic fluid supply line 305 becomes higher than a pressure (unload valve set pressure) obtained by adding a set pressure of a spring to the highest load pressure Plmax of the plurality actuators 3a, 3b, 3c, 3d, 3e, 3f, 3g, and 3h, an open state to return the hydraulic fluid of the common hydraulic fluid supply line 305 to a tank.

The spring that determines an operation pressure of the unload valve 15 has a spring force set such that, when operation levers of a plurality of operation devices that command operation of the plurality of actuators 3a, 3b, 3c, 3d, 3e, 3f, 3g, and 3h are in a neutral position, the pressure of the common hydraulic fluid supply line 305 becomes a little higher than a target LS differential pressure Pgr (hereinafter described).

Further, the hydraulic drive system of the present embodiment includes a hydraulic fluid supply line 31 to which hydraulic fluids delivered from the pilot pumps 130 and 230 of the fixed displacement type are introduced through check valves 133 and 233, respectively, a pilot relief valve 32 that is connected to the hydraulic fluid supply line 31 and keeps the pressure of the hydraulic fluid supply line 31 fixed, a gate lock valve 100 that is connected to the hydraulic fluid supply line 31 and selects whether a pilot hydraulic fluid line on the downstream side is to be connected to the hydraulic fluid supply line 31 or connected to the tank, and a gate lock lever 24 disposed on the driver's seat entrance side of the hydraulic work machine for performing a selection operation of the gate lock valve 100.

The pilot hydraulic fluid line on the downstream side of the gate lock valve 100 is connected to a plurality of pilot valves 60a, 60b, 60c, 60d, 60e, 60f, 60g, and 60h (refer to FIG. 13) provided for the plurality of operation devices, and the plurality of pilot valves 60a, 60b, 60c, 60d, 60e, 60f, 60g, and 60h (refer to FIG. 13) generate a pilot operation pressure according to an operation amount thereof on the basis of hydraulic fluid of the pilot hydraulic fluid line on the downstream side of the gate lock valve 100 to perform selection control of the plurality of flow control valves 6a, 6b, 6c, 6d, 6e, 6f, 6g and 6h with the pilot operation pressure.

The hydraulic drive system of the present embodiment further includes inverters 160 and 260 that respectively control the rotational speeds of the electric motors 101 and 201, step-up/step-down choppers 161 and 261 that respectively supply electric power with a fixed voltage to the inverters 160 and 260, power storage devices 170 and 270 (first and second power storage devices) connected so as to supply electric power to the electric motors 101 and 201 through the step-up/step-down choppers 161 and 261 and the inverters 160 and 260, respectively, battery management systems (BMS) 171 and 271 that output information of a voltage, a temperature, and so forth of the power storage devices 170 and 270 to a controller 50 described later, a reference rotational speed instruction dial 56 for indicating a maximum speed of the plurality of actuators 3a to 3h, a pressure sensor 40 that is provided in the common hydraulic fluid supply line 305 and detects a pressure of the common hydraulic fluid supply line 305, namely, a delivery pressure (hereinafter referred to suitably as pump pressure) Ps of the main pumps 102 and 202, another pressure sensor 41 that is provided in the highest load hydraulic fluid line 306 and detects a pressure of the highest load hydraulic fluid line 306 (highest load pressure Plmax of the plurality of actuators 3a, 3b, 3c, 3d, 3e, 3f, 3g, and 3h), and a controller 50 that receives signals from the battery management systems 171 and 271, reference rotational speed instruction dial 56, and pressure sensors 40 and 41 as inputs thereto to generate rotational speed instruction signals to the inverters 160 and 260.

Figure 2:
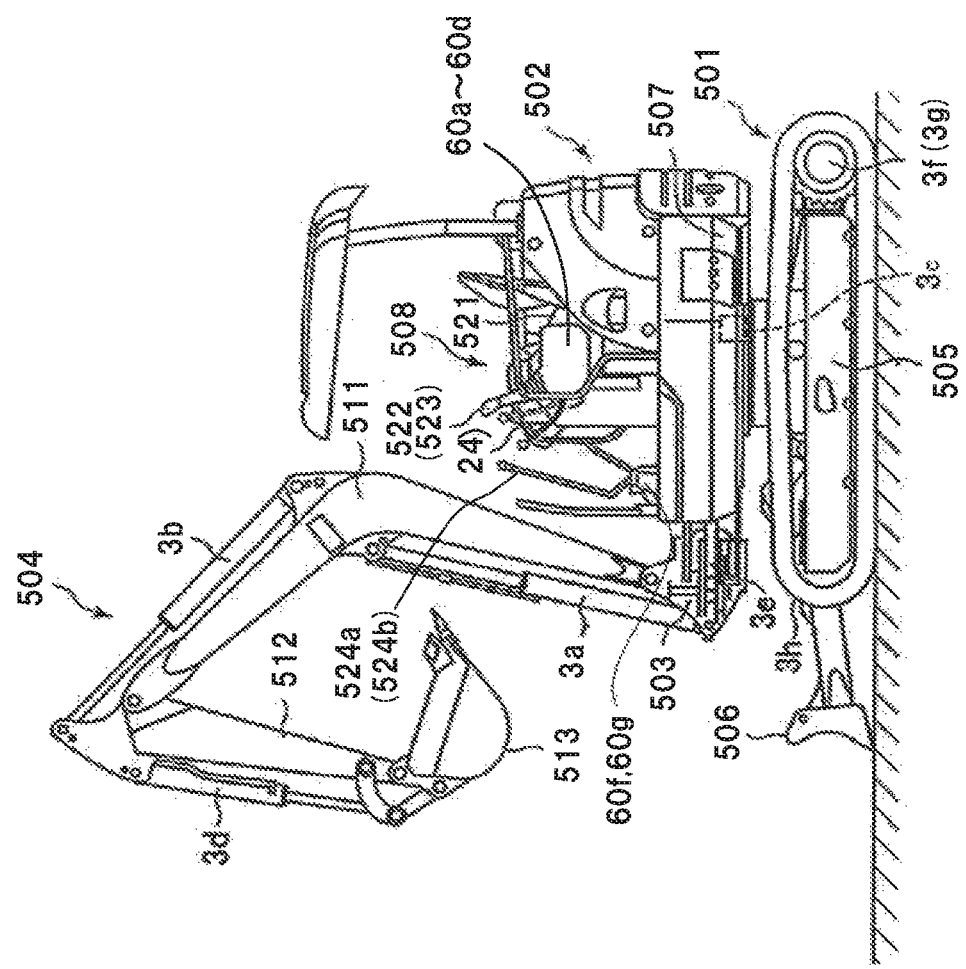
FIG. 2 is a view depicting an appearance of an electrically-driven hydraulic excavator in which the hydraulic drive system of the present invention is incorporated.

FIG. 2 depicts an appearance of an electrically-driven hydraulic excavator in which the hydraulic drive system described above is incorporated.

The electrically-driven hydraulic excavator includes a lower travel structure 501, an upper swing structure 502, and a front work implement 504 of the swing type. The front work implement 504 is configured from a boom 511, an arm 512, and a bucket 513. The upper swing structure 502 is swingable by rotation of the swing motor 3c with respect to the lower travel structure 501. A swing post 503 is provided at a front portion of the upper swing structure 502, and the front work implement 504 is attached for upward and downward movement to the swing post 503. The swing post 503 is rotatable in a horizontal direction with respect to the upper swing structure 502 by extension and contraction of the swing cylinder 3e, and the boom 511, arm 512, and bucket 513 of the front work implement 504 are rotatable in the upward and downward directions by extension and contraction of the boom cylinder 3a, arm cylinder 3b, and bucket cylinder 3d. A blade 506 that performs upward and downward movement by extension and contraction of the blade cylinder 3h is attached to a central frame 505 of the lower travel structure 501. The lower travel structure 501 travels by driving left and right crawler belts by rotation of the travel motors 3f and 3g.

A cabin 508 is installed in the upper swing structure 502, and in the cabin 508, a driver's seat 521, operation devices 522 and 523 (in FIG. 2, only those on the left side are depicted) for the boom, arm, bucket, and swing in which the pilot valves 60a to 60d are built), an operation device (not depicted) for boom-swing in which the pilot valve 60e is built, an operation device (not depicted) for the blade in which the pilot valve 60h is built, operation devices 524a and 524b (in FIG. 2, only those on the left side are depicted) for travel in which pilot valves 60f and 60g are built, the gate lock lever 24, and so forth are provided.

Each of the operation levers of the operation devices 522 and 523 is capable of being operated in an arbitrary direction with reference to cross directions from a neutral position. When the operation lever of the operation device 522 on the left side is operated in the leftward and rightward directions, then the operation device 522 functions as an operation device for swing and the pilot valve 60c (refer to FIG. 13) for swing operates. When the operation lever of the operation device 522 is operated in the forward and backward directions, then the operation device 522 functions as an operation device for the arm and the pilot valve 60b (refer to FIG. 13) for the arm operates. When the operation lever of the operation device 523 on the right side is operated in the forward and backward directions, then the operation device 523 functions as an operation device for the boom and the pilot valve 60a for the boom operates. When the operation lever of the operation device 523 is operated in the leftward and rightward directions, then the operation device 523 functions as an operation device for the bucket and the pilot valve 60d (refer to FIG. 13) for the bucket operates.

Figure 3:
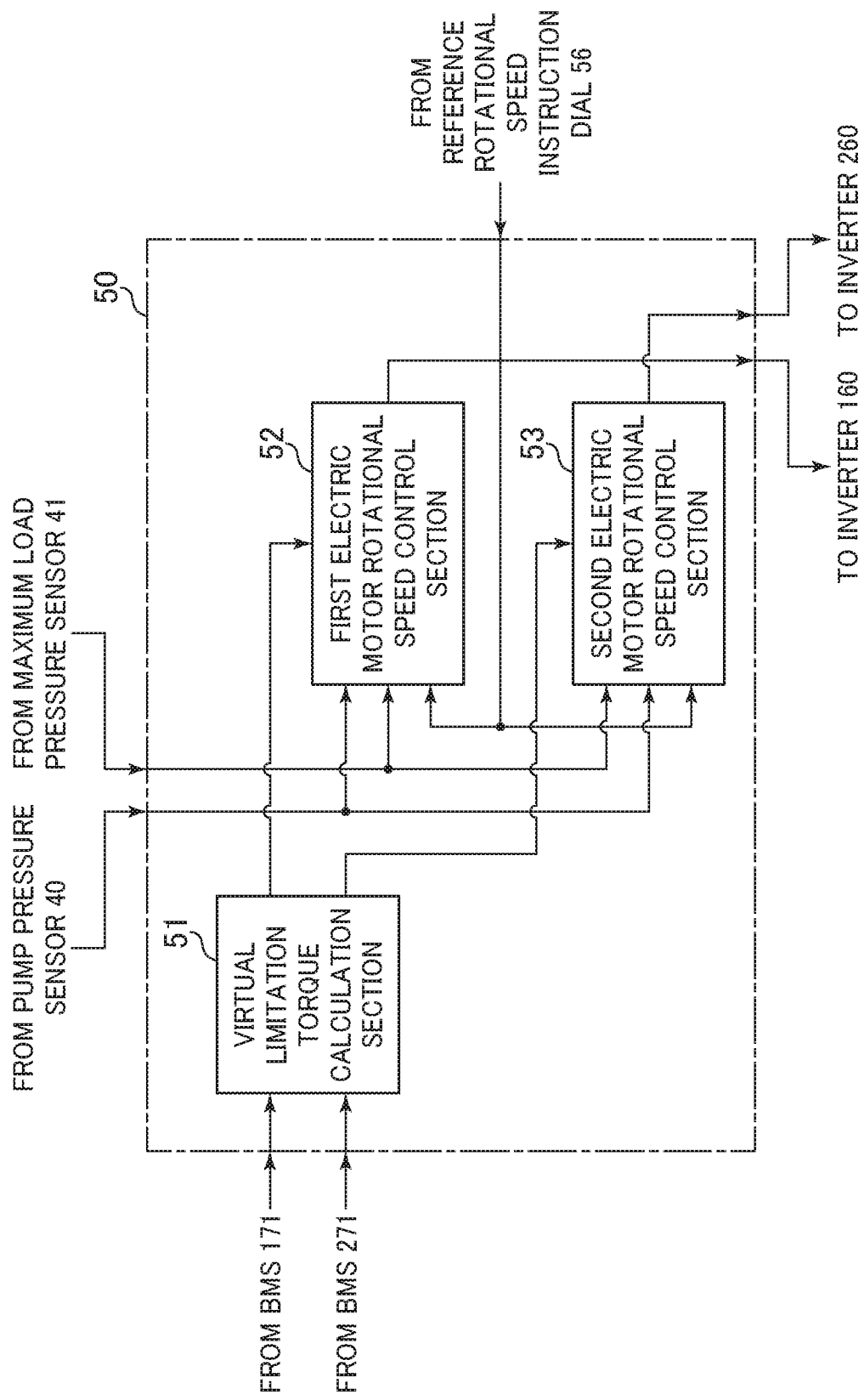
FIG. 3 is a block diagram depicting functions of a controller.

FIG. 3 depicts a functional block diagram of the controller 50 described above.

The controller 50 includes a virtual limitation torque calculation section 51 for the main pumps 102 and 202 of the fixed displacement type, and a first electric motor rotational speed control section 52 and a second electric motor rotational speed control section 53.

The virtual limitation torque calculation section 51 receives information (a voltage, a temperature, and so forth) from the battery management systems 171 and 271 as inputs thereto and performs a predetermined calculation process. Outputs of the virtual limitation torque calculation section 51 are inputted to the first electric motor rotational speed control section 52 and the second electric motor rotational speed control section 53 together with outputs from the pressure sensors 40 and 41 and the reference rotational speed instruction dial 56. The first electric motor rotational speed control section 52 and the second electric motor rotational speed control section 53 perform a predetermined calculation process using the inputs thereto and output results of the processes to the inverters 160 and 260, respectively.

Figure 4:
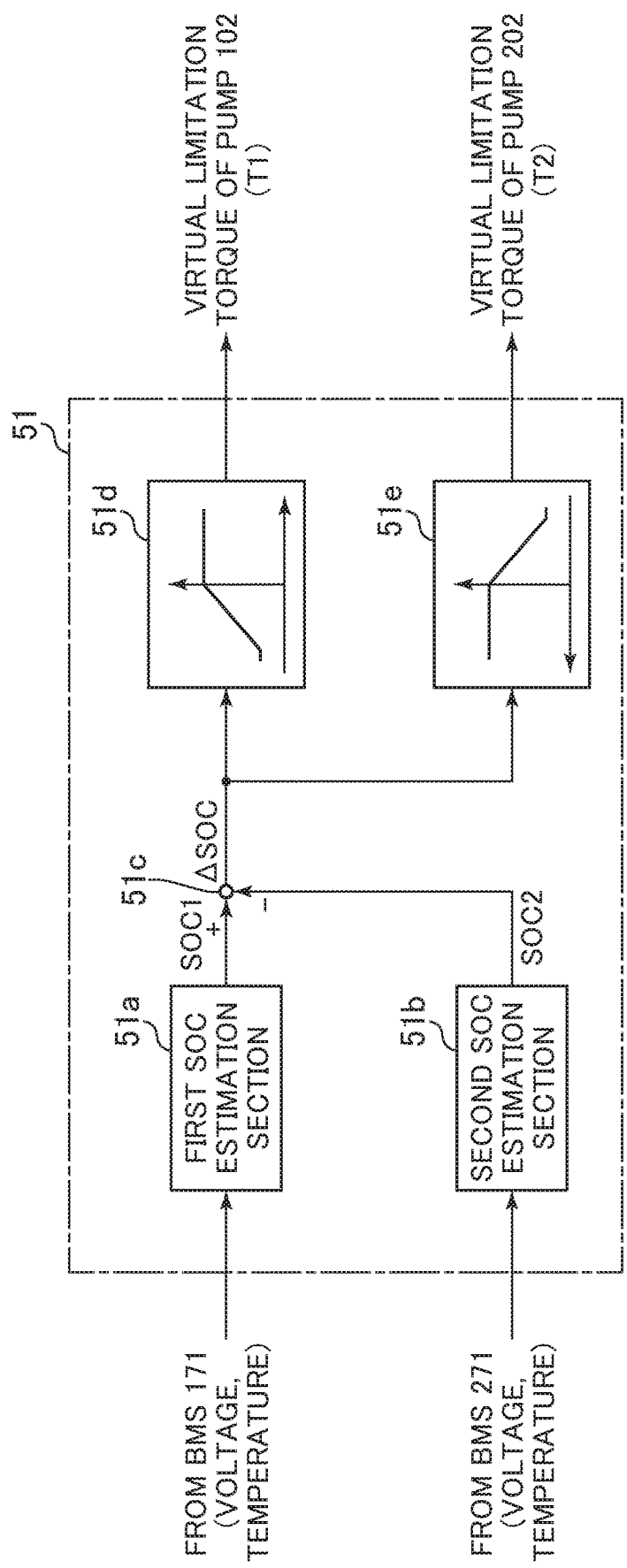
FIG. 4 is a block diagram depicting functions of a virtual torque calculation section of the controller.

FIG. 4 depicts a functional block diagram of the virtual limitation torque calculation section 51 in the controller 50.

The virtual limitation torque calculation section 51 includes first and second SOC estimation sections 51a and 51b, a differentiation section 51c, and first and second tables 51d and 51e.

The first and second SOC estimation sections 51a and 51b receive information (a voltage, a temperature and so forth) from the battery management systems 171 and 271 as inputs thereto, respectively, calculate an SOC (State of Charge) indicative of a charge state of the power storage devices 170 and 270, and outputs SOC1 and SOC2 as the SOCs of them, respectively. The SOC1 and the SOC2 are differentiated by the differentiation section 51c to calculate ΔSOC (=SOC1−SOC2). ΔSOC is inputted to the first and second tables 51d and 51e, by which it is converted into a virtual limitation torque T1 of the main pump 102 and a virtual limitation torque T2 of the main pump 202 (horsepower control amounts).

Figure 5B:
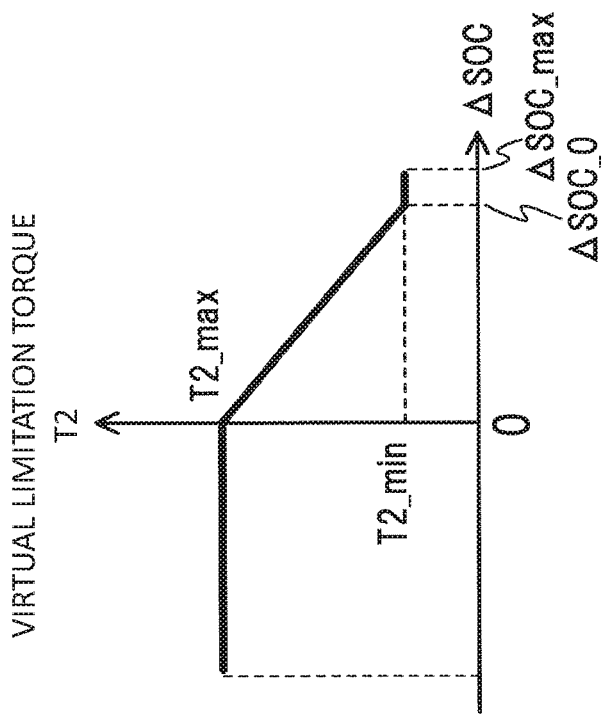
FIG. 5B is a view depicting a characteristic of a second table of the virtual torque calculation section.
Figure 5A:
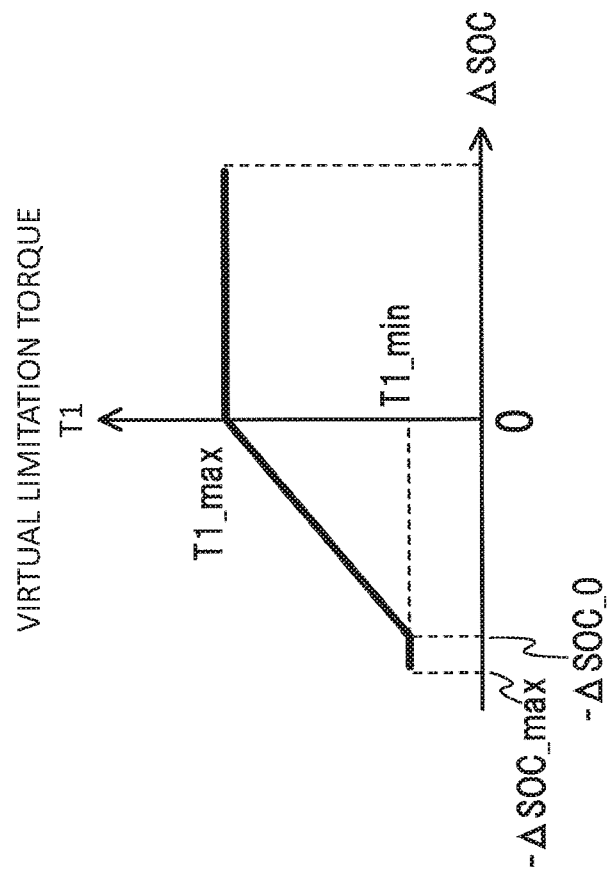
FIG. 5A is a view depicting a characteristic of a first table of the virtual torque calculation section.

FIGS. 5A and 5B depict a characteristic of the first and second tables 51d and 51e.

As depicted in FIG. 5A, the characteristic of the table 51d is set such that, when the difference ΔSOC in a charge state has a positive value, a predetermined maximum value T1_max (fixed) is outputted as the virtual limitation torque T1. However, when ΔSOC has a negative value, the virtual limitation torque T1 that decreases as ΔSOC decreases is outputted, and when ΔSOC reaches −ΔSOC_0 in the proximity of a minimum value −ΔSOC_max, a minimum value T1_min is outputted as the virtual limitation torque T1.

As depicted in FIG. 5B, the characteristic of the table 51e is set to a reverse characteristic to the characteristic of the table 51d. In particular, the characteristic of the table 51e is set such that, when ΔSOC has a negative value, a maximum value T2_max is outputted as the virtual limitation torque T2. However, the characteristic of the table 51e is set such that, when ΔSOC has a positive value, the virtual limitation torque T2 that decreases as ΔSOC increases is outputted, and when ΔSOC reaches ΔSOC_0 in the proximity of the maximum value ΔSOC_max, a minimum value T2_min is outputted as the virtual limitation torque T2.

Figure 6:
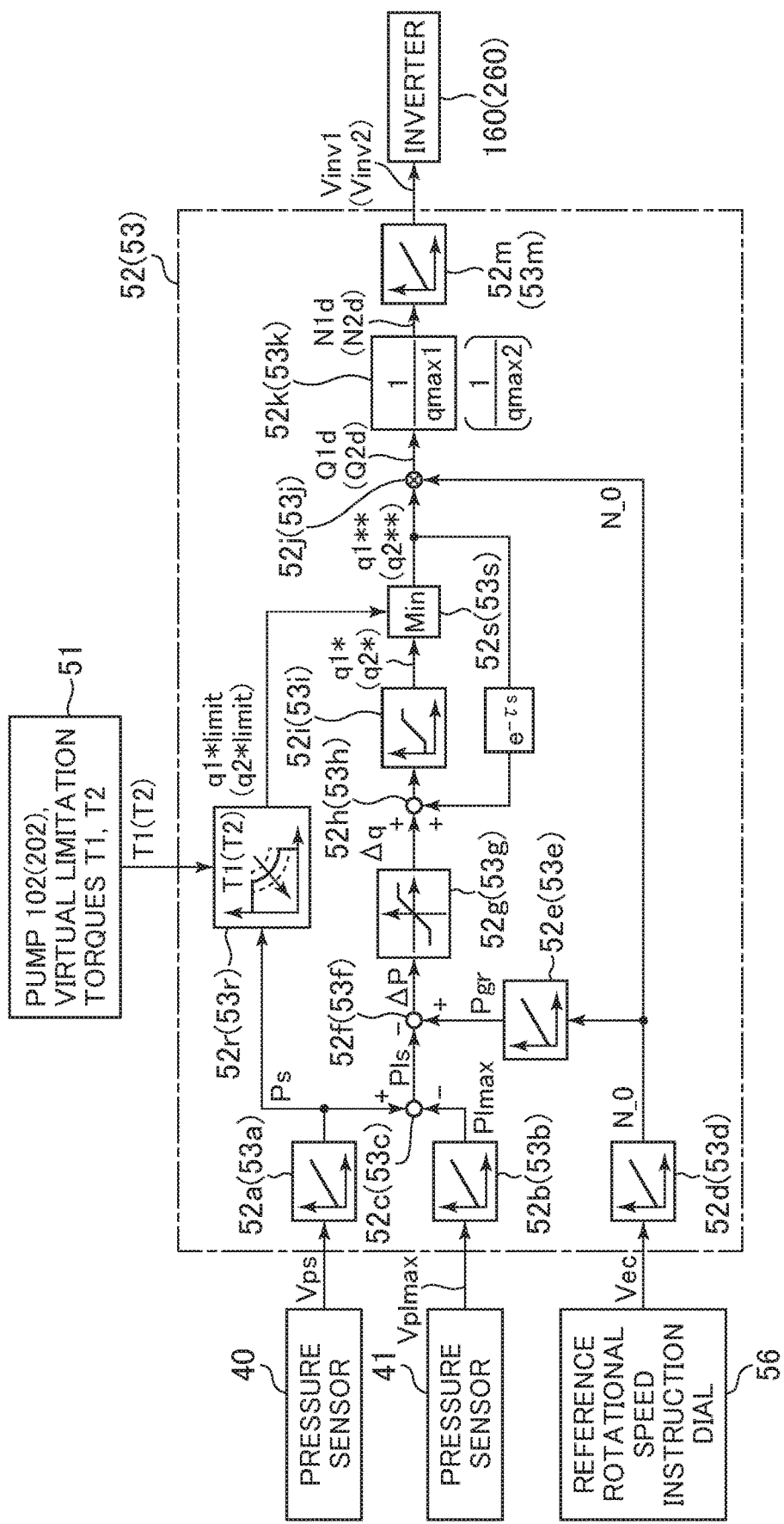
FIG. 6 is a block diagram depicting functions of first and second electric motor rotational speed control sections of the controller.

FIG. 6 depicts a functional block diagram of the first and second electric motor rotational speed control sections 52 and 53 of the controller 50. In the following description, a number in ( ) indicates that it is a number in the case of the second electric motor rotational speed control section 53.

Where outputs from the pressure sensors 40 and 41 are represented by Vps and Vplmax, respectively, the outputs Vps and Vplmax are converted into a pressure of the common hydraulic fluid supply line 305, namely, into a pump pressure Ps and a highest load pressure Plmax of the plurality of actuators 3a to 3h by pressure tables 52a (53a) and 52b (53b), and the difference Pls=Ps−Plmax between them is computed by a differentiation section 52c (53c).

On the other hand, when the output from the reference rotational speed instruction dial 56 is represented by Vec, then the output Vec is converted into a reference rotational speed N_0 by a rotational speed table 52d (53d). Further, the reference rotational speed N_0 is converted into a target LS differential pressure Pgr in accordance with a differential pressure table 52e (53e).

Pls and Pgr described above are inputted to a differentiation section 52f (53f), by which the difference ΔP=Pgr−Pls is computed.

ΔP described above is inputted to a table 52g (53g), by which an increase/decrease amount Δq of the virtual displacement is computed.

Δq described above is added to a virtual displacement q1 (q2) after reflection of horsepower control before one control step stored in a memory and is further limited with a minimum value and a maximum value therefor by a table 52i (53i) to compute a virtual displacement q1* (q2*) before reflection of new horsepower.

On the other hand, the pump pressure Ps described hereinabove and the virtual limitation torque T1 (T2) that is output of the virtual limitation torque calculation section 51 in the controller 50 are inputted to the variable horsepower control table 52r (53r), by which they are converted into and outputted as a limit value q1*limit (q2*limit) for the virtual displacement as first and second allowable values for the absorption horsepower (consumption horsepower) of the main pumps 102 and 202.

Figure 7:
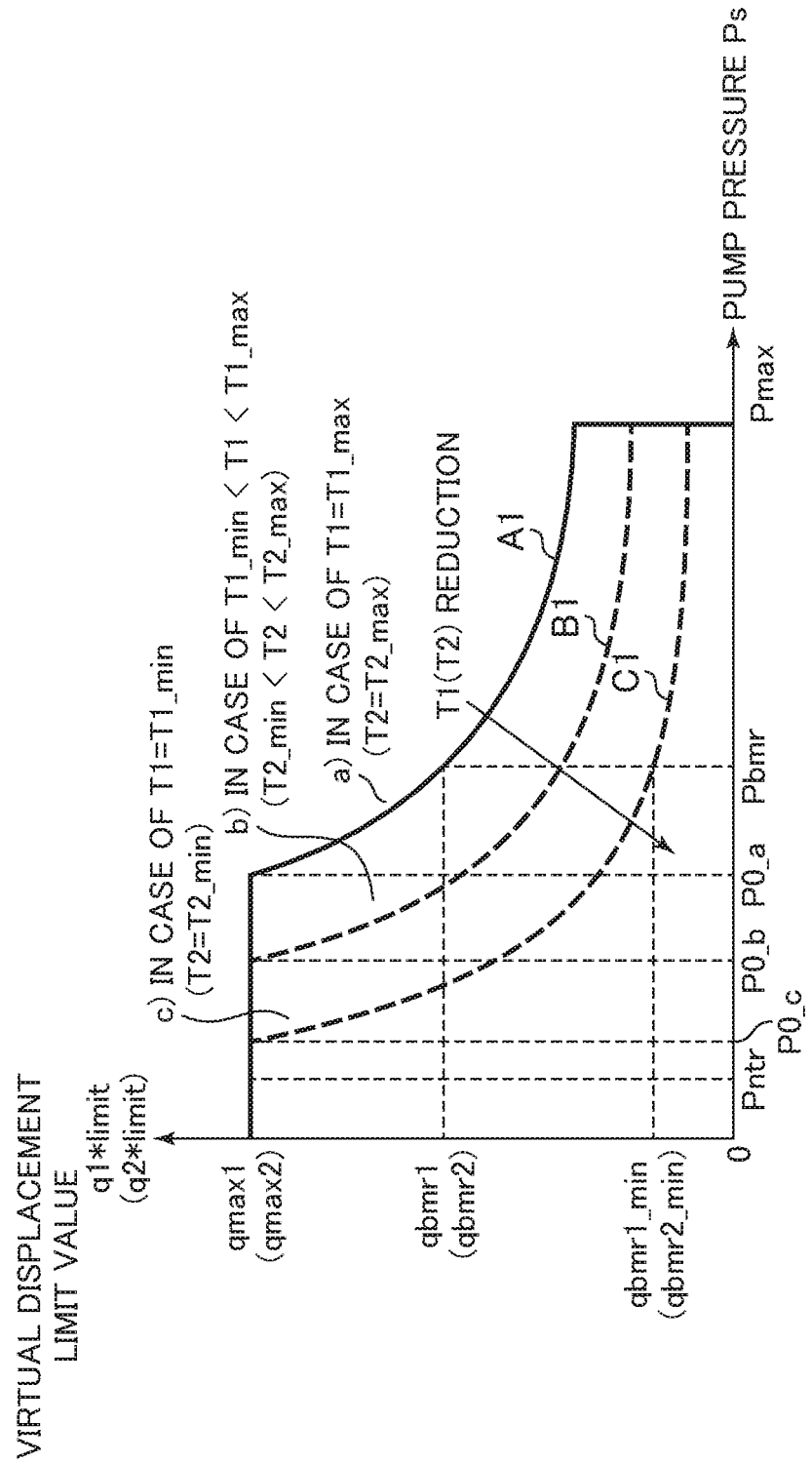
FIG. 7 is a view depicting a characteristic of a variable horsepower controlling table in the first and second electric motor rotational speed control sections.

A characteristic of the variable horsepower control tables 52r and 53r is depicted in FIG. 7.

A characteristic indicated by a solid line A1 of the variable horsepower control tables 52r and 53r is a characteristic that simulates so-called horsepower control and is such a characteristic that, as the pump pressure Ps becomes high, the limit value q1*limit (q2*limit) for the virtual displacement of the pump pressure Ps decreases.

Further, the characteristic is such a characteristic that, as the virtual limitation torque T1 (T2) decreases, the characteristic simulating horsepower control changes like a broken line B1 or C1 as indicated by an arrow mark in FIG. 7, and consequently, the degree of the limit becomes stronger, and the limit value q1*limit (q2*limit) for the virtual displacement decreases.

A lower one of the virtual displacement q1* (q2*) before reflection of horsepower control described hereinabove and the limit value q1*limit (q2*limit) for the virtual displacement outputted from the variable horsepower control table 52r (53r) described above is selected as the virtual displacement q1 (q2) after reflection of horsepower control by the minimum value selection section 52s (53s).

Furthermore, the virtual displacement q1 (q2) is multiplied by the reference rotational speed N_0 by a multiplication section 52j (53j), and a result of the multiplication is outputted as a target flow rate Q1d (Q2d).

If the physical displacement of the main pumps 102 and 202 of the fixed displacement type is represented by qmax1 (qmax2), then the target flow rate Q1d is multiplied by 1/qmax1 (1/qmax2) of a gain 52k (53k) so as to be converted into a target rotational speed N1d (N2d).

Furthermore, the target rotational speed N1d (N2d) is converted into an input Vinv1 (Vinv2) to the inverter 160 (260) and outputted to the inverter 160 (260) by the table 52m (53m).

~Correspondence to Claims~

In the foregoing, the main pumps 102 and 202 of the fixed displacement type are first and second hydraulic pumps, and hydraulic fluids delivered from the first and second hydraulic pumps are merged in the common hydraulic fluid supply line 305 and supplied to the plurality of flow control valves 6a, 6b, 6c, 6c, 6e, 6f, 6g, and 6h and is further supplied to the plurality of actuators 3a, 3b, 3c, 3d, 3e, 3f, 3g, and 3h.

The electric motors 101 and 201 are first and second electric motors that drive the main pumps 102 and 202 (first and second hydraulic pumps), respectively, and the power storage devices 170 and 270 are first and second power storage devices that supply electric power to the electric motors 101 and 201 (first and second electric motors), respectively.

The variable horsepower control table 52r and the minimum value selection section 52s in the electric motor rotational speed control section 52 of the controller 50 cooperates with the pressure sensor 40 to provide a first horsepower control device configured to decrease, when the delivery pressure of the main pump 102 (first hydraulic pump) increases, the delivery flow rate of the main pump 102 (first hydraulic pump) to control the absorption horsepower of the main pump 102 (first hydraulic pump) so as not to exceed the limit value q1*limit (first allowable value) for the virtual displacement. The variable horsepower control table 53r and the minimum value selection section 53s in the electric motor rotational speed control section 53 of the controller 50 cooperate with the pressure sensor 40 to provide a second horsepower control device configured to decrease, when the delivery pressure of the main pump 202 (second hydraulic pump) increases, the delivery flow rate of the main pump 202 (second hydraulic pump) to control the absorption horsepower of the main pump 202 (second hydraulic pump) so as not to exceed the limit value q2*limit (second allowable value) for the virtual displacement.

The virtual limitation torque calculation section 51 of the controller 50 and the variable horsepower control tables 52r and 53r in the electric motor rotational speed control sections 52 and 53 provide a horsepower distribution control section configured to change at least one of the limit values q1*limit and q2*limit (first and second allowable values) of the first and second horsepower control devices such that the charge state of the power storage device 170 (first power storage device) and the charge state of the power storage device 270 (second power storage device) become equal to each other.

Further, in the present embodiment, the main pumps 102 and 202 (first and second hydraulic pumps) are hydraulic pumps of the fixed displacement type, and the first and second horsepower control devices are configured to control the rotational speeds of the main pump 102 (first hydraulic pump) and the main pump 202 (second hydraulic pump) to control the absorption horsepowers of the main pumps 102 and 202 (first and second hydraulic pumps) such that the absorption horsepower of the main pump 102 does not exceed the limit value q1*limit (first allowable value) and the absorption horsepower of the main pump 202 does not exceed the limit value q2*limit (second allowable value).

Tables 52a to 52m in the electric motor rotational speed control section 52 of the controller 50 and the inverter 160 cooperate with the pressure sensors 40 and 41 and the reference rotational speed instruction dial 56 to provide a first flow control section configured to perform, when at least one of the operation devices 522 and 523, 524a, 524b, . . . is operated, load sensing control for controlling a delivery flow rate of the main pump 102 (first hydraulic pump) such that the delivery pressure Ps of the main pump 102 (first hydraulic pump) becomes higher by a target differential pressure (target LS differential pressure Pgr) than the highest load pressure Plmax of the plurality of actuators 3a to 3h. Tables 53a to 53m in the electric motor rotational speed control section 53 of the controller 50 and the inverter 260 cooperate with the pressure sensors 40 and 41 and the reference rotational speed instruction dial 56 to provide a second flow control section configured to perform, when at least one of the operation devices 522, 523, 524a, 524b, . . . is operated, load sensing control for controlling a delivery flow rate of the main pump 202 (second hydraulic pump) such that the delivery pressure Ps of the main pump 202 (second hydraulic pump) becomes higher by the target differential pressure (target LS differential pressure Pgr) than the highest load pressure Plmax of the plurality of actuators 3a to 3h.

The first and second flow control sections described above are configured to control the rotational speeds of the main pumps 102 and 202 (first and second hydraulic pumps) respectively to control the delivery flow rate of the main pumps 102 and 202 (first and second hydraulic pumps) such that the delivery pressures of the main pumps 102 and 202 become higher by the target differential pressure than the highest load pressure of the plurality of actuators 3a to 3h. The first and second horsepower control devices described above are configured to control the delivery flow rates of the main pumps 102 and 202 (first and second hydraulic pumps) respectively, which are controlled by the load sensing control, such that the absorption horsepower of the main pump 102 (first hydraulic pump) does not exceed the limit value q1*limit (first allowable value) for the virtual displacement and the absorption horsepower of the main pump 202 (second hydraulic pump) does not exceed the limit value q2*limit (second allowable value) for the virtual displacement.

The battery management system 171 and the first SOC estimation section 51a in the virtual limitation torque calculation section 51 of the controller 50 provide a first charge state estimation section configured to estimate a charge state of the power storage device 170 (first power storage device), and the battery management system 271 and the second SOC estimation section 51b in the virtual limitation torque calculation section 51 of the controller 50 provide a second power storage stage estimation section configured to estimate a charge state of the power storage device 270 (second power storage device).

The differentiation section 51c and the first and second tables 51d and 51e in the virtual limitation torque calculation section 51 of the controller 50 provide a horsepower control amount calculation section configured to calculate, when the charge state of the power storage device 170 (first power storage device) estimated by the first charge state estimation section described above is lower than the charge state of the power storage device 270 (second power storage device) estimated by the second charge state estimation section described above, the virtual limitation torque T1 (first horsepower control amount) for decreasing the absorption horsepower of the main pump 102 (first hydraulic pump) and calculate, when the charge state of the power storage device 270 (second power storage device) estimated by the second charge state estimation section described above is lower than the charge state of the power storage device 170 (first power storage device) estimated by the first charge state estimation section described above, the virtual limitation torque T2 (second horsepower control amount) for decreasing the absorption horsepower of the main pump 202 (second hydraulic pump).

The variable horsepower control table 52r in the electric motor rotational speed control section 52 of the controller 50 provides a first allowable value changing section configured to change the limit value q1*limit (first allowable value) for the virtual displacement of the first horsepower control device described above on the basis of the virtual limitation torque T1 (first horsepower control amount) calculated by the horsepower control amount calculation section described above. The variable horsepower control table 53r that simulates the horsepower control characteristic in the electric motor rotational speed control section 53 of the controller 50 provides a second allowable value changing section configured to change the limit value q2*limit (second allowable value) for the virtual displacement of the second horsepower control device described above on the basis of the virtual limitation torque T2 (second horsepower control amount) calculated by the horsepower control amount calculation section described above.

~Operation~

Operation of the present embodiment is described with reference to FIGS. 1 to 7.

Hydraulic fluids delivered from the pilot pumps 130 and 230 of the fixed displacement type driven by the electric motors 101 and 201 are supplied to the hydraulic fluid supply line 31 through the check valves 133 and 233, respectively. To the hydraulic fluid supply line 31, the pilot relief valve 32 is connected, and a pilot primary pressure Ppi0 is generated in the hydraulic fluid supply line 31.

Meanwhile, information such as a voltage, a temperature, and so forth of the power storage devices 170 and 270 is introduced to the first and second SOC estimation sections 51a and 51b of the virtual limitation torque calculation section 51 in the controller 50 through the battery management systems 171 and 271, and from the charge state SOC1 of the power storage device 170 and the charge state SOC2 of the power storage device 270, virtual limitation torques T1 and T2 of the main pumps 102 and 202 of the fixed displacement type are calculated and outputted to the rotational speed control section 52 of the electric motor 101 and the rotational speed control section 53 of the electric motor 201, respectively.

(a) Case where the SOCs of the power storage device 170 and the power storage device 270 are equal to each other First, a case is considered in which, in the functional block diagram of the virtual limitation torque calculation section 51 depicted in FIG. 4, the charge state SOC1 of the power storage device 170 estimated by the first SOC estimation section 51a and the charge state SOC2 of the power storage device 270 estimated by the second SOC estimation section 51b are equal to each other.

Since SOC1=SOC2, ΔSOC computed by the differentiation section 51c becomes ΔSOC=SOC1−SOC2=0, and from the characteristics of the first and second tables 51d and 51e depicted in FIGS. 5A and 5B, the virtual limitation torques T1 and T2 of the main pumps 102 and 202 become T1=T1_max and T2=T2_max, respectively.

The virtual limitation torques T1 and T2 that are outputs of the virtual limitation torque calculation section 51 are introduced to the variable horsepower control tables 52r and 53r of the electric motor rotational speed control sections 52 and 53, respectively.

<(a-1) Case where all Operation Levers are Neutral>

Since all operation levers (hereinafter referred to simply as operation levers as necessary) of all operation devices 522, 523, 524a, 524b, . . . are neutral, all flow control valves 6a, 6b, 6c, 6d, 6e, 6f, 6g, and 6h (refer to FIG. 13) are in a neutral position.

Therefore, the highest load pressure Plmax of the actuators 3a, 3b, 3c, 3d, 3e, 3f, 3g, and 3h is equal to the tank pressure through the flow control valves 6a, 6b, 6c, 6d, 6e, 6f, 6g, and 6h and the shuttle valves 9a, 9b, 9c, 9d, 9e, 9f, and 9g.

The highest load pressure Plmax is introduced to the unload valve 15 and the pressure sensor 41.

Although hydraulic fluids delivered from the main pumps 102 and 202 of the fixed displacement type driven by the electric motors 101 and 201 are introduced to the common hydraulic fluid supply line 305, since all of the plurality of flow control valves 6a, 6b, 6c, 6d, 6e, 6f, 6g, and 6h are in their neutral position as described hereinabove, the hydraulic fluid is discharged from the unload valve 15 to the tank.

Since Plmax introduced to the unload valve 15 is equal to the tank pressure (estimated that the tank pressure≈0), the pressure of the common hydraulic fluid supply line 305, namely, the pump pressure Ps, is kept a little higher than Pgr that is a target LS differential pressure by the work of a spring provided in the unload valve 15.

The pressure (pump pressure) Ps of the common hydraulic fluid supply line 305 is introduced to the pressure sensor 40.

An output Vps of the pressure sensor 40 for the pump pressure Ps, an output Vplmax of the pressure sensor 41 for the highest load pressure Plmax and an output Vec of the reference rotational speed instruction dial 56 are inputted to the electric motor rotational speed control sections 52 and 53 in the controller 50 in addition to the virtual limitation torques T1 and T2 described hereinabove.

Since the electric motor rotational speed control section 52 and the electric motor rotational speed control section 53 operate similarly, the following description is given taking the first electric motor rotational speed control section 52 as an example.

Vps, Vplmax, and Vec described above are converted into Ps, Plmax, and N_0 by the tables 52a, 52b and 52d, respectively, and from Ps and Plmax, the difference Pls=Ps−Plmax between them is computed by the differentiation section 52c (53c).

The difference ΔP between the target LS differential pressure Pgr converted from the reference rotational speed N_0 by the table 52e and Pls described hereinabove is calculated by the differentiation section 52f. At this time, in the case where all operation levers are neutral, Ps is kept at a value a little higher than Pgr as described hereinabove, and since Plmax is the tank pressure (estimated that the tank pressure≈0), Pls=Ps−Plmax is kept at a value a little higher than Pgr. Therefore, ΔP becomes ΔP=Pgr−Pls<0, and the increase/decrease amount Δq of the virtual displacement calculated by the table 52g has a negative value.

The increase/decrease amount Δq of the virtual displacement is added to the virtual displacement q1** after reflection of horsepower control before one control step, and after the resulting sum is limited with the minimum value and the maximum value by the table 52i, it becomes a new virtual displacement q1* after reflection of horsepower control. Since the increase/decrease amount Δq of the virtual displacement has a negative value, by repeating the control step, the virtual displacement q1* before reflection of horsepower control is kept at the minimum value prescribed by the table 52i.

On the other hand, since T1_max is inputted as the virtual limitation torque T1 as described above to the variable horsepower control table 52r, the limit value q1*limit for the virtual displacement has a value on the solid line A1 in FIG. 7.

As described hereinabove, in the case where all operation levers are neutral, the pump pressure Ps is kept at a value a little higher than Pgr, and if Ps at this time is represented by Pntr, the limit value q1*limit for the becomes q1*limit=qmax1 from FIG. 7.

As described above, since, in the case where all operation levers are neutral, the virtual displacement q1* before reflection of horsepower control is kept at the minimum value prescribed by the table 52i and the relationship of q1*<q1*limit is satisfied, q1* is selected from between q1* and q1*limit by the minimum value selection section 52s and becomes the virtual displacement q1** after reflection of horsepower control.

The virtual displacement q1** after reflection of horsepower control is multiplied by the reference rotational speed N_0 by the multiplication section 52j and becomes a target flow rate Q1d, and the target flow rate Q1d is converted into a target rotational speed N1d by multiplication by 1/qmax1 with the gain 52k and is further converted into an output Vnv1 to the inverter 160 by the table 52m.

As described above, since, in the case where all operation levers are neutral, the virtual displacement q1** after reflection of horsepower control is kept at the minimum value prescribed by the table 52i, also the target flow rate Q1d and the target rotational speed N1d are also kept at minimum values.

In particular, in the case where all operation levers are neutral, the rotational speed of the electric motor 101 is kept at a minimum rotational speed, and also the delivery flow rate from the main pump 102 of the fixed displacement type is kept at its minimum.

Since also the electric motor rotational speed control section 53 operates similarly, the rotational speed of the electric motor 201 is kept at its minimum rotational speed, and also the delivery flow rate from the main pump 202 of the fixed displacement type is kept at a minimum.

<(a-2) Case where Boom Raising is Operated>

A case is considered in which the operation lever of the operation device 523 for boom is inputted in a raising direction, namely, in a direction in which the boom cylinder 3a is extended.

The flow control valve 6a for the boom selects the leftward direction in the figure, and hydraulic fluids of the hydraulic fluid supply lines 105 and 205 from the main pumps 102 and 202 of the fixed displacement type are supplied to the bottom side of the boom cylinder 3a through the common hydraulic fluid supply line 305, pressure compensating valve 7a, and flow control valve 6a.

On the other hand, the load pressure of the boom cylinder 3a is introduced as the highest load pressure Plmax to the pressure compensating valves 7a, 7b, 7c, 7d, 7e, 7f, 7g, and 7h, unload valve 15, and pressure sensor 41 through the load port of the flow control valve 6a, shuttle valves 9a, 9b, 9c, 9d, 9e, 9f, and 9g, and highest load hydraulic fluid line 306.

By the load pressure of the boom cylinder 3a introduced to the unload valve 15, the set pressure of the unload valve 15 rises to a pressure of the sum of the spring force of the unload valve 15 and the highest load pressure Plmax (load pressure of the boom cylinder 3a), whereupon the hydraulic line for discharging the hydraulic fluid in the common hydraulic fluid supply line 305 to the tank is interrupted.

The pressure (pump pressure Ps) of the common hydraulic fluid supply line 305 is introduced to the pressure sensor 40.

The output Vps of the pressure sensor 40 for the pump pressure Ps, the output Vplmax of the pressure sensor 41 for the highest load pressure Plmax, and the output Vec of the reference rotational speed instruction dial 56 are inputted to the electric motor rotational speed control sections 52 and 53 in the controller 50 in addition to the virtual limitation torques T1 and T2 described hereinabove.

Since the electric motor rotational speed control section 52 and the electric motor rotational speed control section 53 operate similarly, the following description is given taking the electric motor rotational speed control section 52 as an example.

Vps, Vplmax, and Vec described hereinabove are converted into Ps, Plmax, and N_0 by the tables 52a, 52b, and 52d, respectively.

Immediately after boom raising activation, the pump pressure Ps has a value a little higher than the target LS differential pressure similarly as in the case where all operation levers are neutral, and usually, in the case where the boom cylinder 3a is extended, the load pressure of the boom cylinder 3a is often higher than the pump pressure. Since, in this case, Ps<Plmax is satisfied, Pls becomes Pls=Ps−Plmax<0.

The difference ΔP between the target LS differential pressure Pgr converted from the reference rotational speed N_0 by the table 52e and Pls described above is calculated by the differentiation section 52f.

Since Pls has a negative value as described above, ΔP=Pgr−Pls has a positive value higher than Pgr.

Although ΔP is converted into an increase/decrease amount Δq of the virtual displacement by the table 52g, since ΔP becomes a positive value higher than Pgr, also the increase/decrease amount Δq of the virtual displacement has a positive value.

The increase/decrease amount Δq of the virtual displacement is added to the virtual displacement q1** after reflection of horsepower control before one control step and is limited with the minimum value and the maximum value by the table 52i, whereafter it becomes a new virtual displacement q1* before reflection of horsepower control.

Since Δq that is the increase/decrease amount of the virtual displacement has a positive value as described above, by repeating the control step, the virtual displacement q1* before reflection of horsepower control gradually increases within the range between the minimum value and the maximum value of the table 52i, and the increase continues until after ΔP=Pgr−Pls becomes 0, namely, until after Pls becomes equal to Pgr that is the target LS differential pressure.

On the other hand, since T1_max is inputted as the virtual limitation torque T1 as described hereinabove to the variable horsepower control table 52r, the limit value q1*limit of the virtual displacement has a value on the solid line A1 of FIG. 7.

In the case where, in boom raising operation, the LS differential pressure Pls is equal to the target LS differential pressure Pgr as described hereinabove, the pump pressure Ps is kept at a pressure higher by the target LS differential pressure Pgr than the highest load pressure Plmax.

From FIG. 7, if the pump pressure Ps upon boom raising operation at this time is represented by Pbmr, then the limit value q1*limit of the virtual displacement becomes qbmr1 that is lower than qmax simulating horsepower control.

Since the minimum value selection section 52s selects a smaller one of the virtual displacement q1* before reflection of horsepower control described above and the output q1*limit of the variable horsepower control table 52r as the virtual displacement q1 after reflection of horsepower control, the virtual displacement q1 after reflection of horsepower control performs operation that simulates a main pump of variable displacement type that delivers a necessary flow rate within the range of the horsepower control characteristic prescribed by the variable horsepower control table 52r.

The virtual displacement q1** after reflection of horsepower control is multiplied by the reference rotational speed N_0 by the multiplication section 52j and becomes a target flow rate Q1d, and the target flow rate Q1d is converted into a target rotational speed N1d by multiplication by 1/qmax1 by the gain 52k and is further converted into an output Vinv1 to the inverter 160 by the table 52m.

Also the electric motor rotational speed control section 53 operates similarly, and the flow rates of hydraulic fluids delivered from the main pumps 102 and 202 of the fixed displacement type are merged and supplied to the flow control valve 6a.

As described hereinabove, the virtual displacements q1 and q2 after reflection of horsepower control operate simulating a main pump of the variable displacement type that delivers a flow rate necessary within the range of the horsepower control characteristics prescribed by the variable horsepower control tables 52r and 53r to control the rotational speeds of the electric motors 101 and 201 such that the flow rate is implemented. Therefore, the virtual displacements q1 and q2 after reflection of horsepower control operate so as to control the rotational speed of the electric motor 101 such that the total delivery amount of the main pumps 102 and 202 of the fixed displacement type becomes equal to a flow rate required by the flow control valve 6a within a range within which the consumption horsepower of the main pumps 102 and 202 of the fixed displacement type does not exceed a certain value.

(b) Case where the SOC of the Power Storage Device 170 is Greater than that of the Power Storage Device 270

A case is considered in which, in the functional block diagram of the virtual limitation torque calculation section 51 depicted in FIG. 4, the relationship between the charge state SOC1 of the power storage device 170 estimated by the first SOC estimation section 51a and the charge state SOC2 of the power storage device 270 estimated by the second SOC estimation section 51b is SOC1>SOC2.

Since SOC1>SOC2, ΔSOC computed by the differentiation section 51c becomes ΔSOC=SOC1−SOC2>0, namely, has a positive value, from the characteristics of the tables 51d and 51e depicted in FIGS. 5A and 5B, the virtual limitation torque T1 of the main pump 102 of the fixed displacement type becomes T1=T1_max, and the virtual limitation torque T2 of the main pump 202 of the fixed displacement type becomes a value lower than T2_max. Here, a case in which ΔSOC=SOC1−SOC2=ΔSOC_0 is considered. From FIG. 5B, T2 at this time is T2=T2_min.

The virtual limitation torques T1 and T2 that are outputs of the virtual limitation torque calculation section 51 are introduced to the variable horsepower control tables 52r and 53r of the electric motor rotational speed control sections 52 and 53, respectively.

<(b-1) Case where all Operation Levers are Neutral>

In the case where all operation levers are neutral, both of the main pumps 102 and 202 of the fixed displacement type deliver a minimum flow rate at a minimum rotational speed similarly as in the case of (a) SOC1=SOC2 described hereinabove.

<(b-2) Case where Boom Raising Operation is Performed>

Basic operation in which the main pumps 102 and 202 deliver a necessary flow rate by load sensing control within ranges of the horsepower prescribed by the virtual limitation torques T1 and T2, respectively, is similar to that in the case of (a) SOC1=SOC2 described hereinabove.

In the case where SOC1>SOC2 and ΔSOC (=SOC1−SOC2) is ΔSOC_0, T1=T1_max and T2=T2_min as described hereinabove.

Since the virtual limitation torque T1 of the main pump 102 of the fixed displacement type is T1=T1_max, operation quite same as that of (a) described above is performed.

On the other hand, the virtual limitation torque T2 of the main pump 202 of the fixed displacement type is T2=T2_min and is lower than the virtual limitation torque T1 of the main pump 102, and as indicted by a broken line C1 in FIG. 7, the virtual displacement q2** after reflection of horsepower control is limited to qbmr2_min by the table 53r.

The virtual displacement q2** after reflection of horsepower control is multiplied by the reference rotational speed N_0 by the multiplication section 53j and becomes a target flow rate Q2d, and the target flow rate Q2d is converted into a target rotational speed N2d by multiplication by 1/qmax2 with the gain 53k and is further converted into an output Vinv2 to the inverter 260 by the table 53m.

At this time, since the virtual displacement q2** after reflection of horsepower control of the main pump 202 of the fixed displacement type is limited to qbmr2_min as described hereinabove, the rotational speed N2d is limited so as to be lower than the rotational speed N1d of the main pump 102 of the fixed displacement type.

In this manner, in the case where SOC1>SOC2, namely, in the case where the SOC of the power storage device 270 is smaller than the SOC of the power storage device 170, the flow rate delivered from the main pump 202 that is driven by electric power supplied from the power storage device 270 is lower than the flow rate delivered from the main pump 102 that is driven by electric power supplied from the power storage device 170.

Although the power consumption of the pump increases in proportion to the pressure×flow rate and the pressure (pump pressure Ps) of the common hydraulic fluid supply line 305 is common and equal, since the flow rate of the main pump 202 is lower than the flow rate of the main pump 102 as described above, the power consumption of the main pump 202 becomes smaller than the power consumption of the main pump 102.

Therefore, the electric power consumption of the power storage device 270 from which electric power is supplied to the main pump 202 becomes lower than the electric power consumption of the power storage device 170 from which electric power is supplied to the main pump 102.

Since the electric power consumption of the power storage device 270 from which electric power is supplied to the main pump 202 is lower than the electric power consumption of the power storage device 170 from which electric power is supplied to the main pump 102, the rate at which the SOC2 of the power storage device 270 decreases becomes lower than the rate at which the SOC1 of the power storage device 170 decreases, and this continues until after the SOC1 becomes equal to the SOC2.

If SOC1=SOC2 is satisfied, then operation same as that in the case of (a) is performed.

(c) Case where the SOC of the Power Storage Device 270 is Higher than that of the Power Storage Device 170

A case is considered in which, in the functional block diagram of the virtual limitation torque calculation section 51 depicted in FIG. 4, the relationship between the charge state SOC1 of the power storage device 170 estimated by the first SOC estimation section 51a and the charge state SOC2 of the power storage device 270 estimated by the second SOC estimation section 51b is SOC1<SOC2 is considered.

In the following, the relationship between the main pumps 102 and 202 of the fixed displacement type is reverse to that in the case of SOC1>SOC2 of (b).

Since SOC1<SOC2, ΔSOC computed by the differentiation section 51c becomes ΔSOC=SOC1−SOC2<0, namely, has a negative value, from the characteristic of the tables 51d and 51e depicted in FIGS. 5A and 5B, the virtual limitation torque T2 of the main pump 202 of the fixed displacement type becomes T2=T2_max and the virtual limitation torque T1 of the main pump 102 of the fixed displacement type has a value lower than T1_max. Here, a case in which ΔSOC=SOC1−SOC2=−ΔSOC_0 is considered. From FIG. 5A, the virtual limitation torque T1 at this time is T1=T1_min.

The virtual limitation torques T1 and T2 that are outputs of the virtual limitation torque calculation section 51 are introduced to the variable horsepower control tables 52r and 53r of the electric motor rotational speed control sections 52 and 53, respectively.

<(c-1) Case where all Operation Levers are Neutral>

In the case where all operation levers are neutral, both of the main pumps 102 and 202 deliver a minimum flow rate at a minimum rotational speed similarly as in the cases of (a) SOC1=SOC2 and (b) SOC1>SOC2 described above.

<(c-2) Case where Boom Raising is Operated>

Basic operation in which the main pumps 102 and 202 deliver hydraulic fluids of necessary flow rates by load sensing control within ranges of the horsepower prescribed by the virtual limitation torques T1 and T2, respectively, is similar to that in the case of (a) SOC1=SOC2 described hereinabove.

In the case where SOC1<SOC2 and ΔSOC (=SOC1−SOC2) is −ΔSOC_0 as described above, T1=T1_min and T2=T2_max.

Since the virtual limitation torque T2 of the main pump 202 of the fixed displacement type is T2=T2_max, operation quite same as that in (a) described hereinabove is performed.

On the other hand, the virtual limitation torque T1 of the main pump 102 of the fixed displacement type is T1=T1_min and is lower than the virtual limitation torque T2 of the main pump 202, and as indicated by the broken line C1 of FIG. 7, the virtual displacement q1** after reflection of horsepower control is limited to qbmr1_min by the table 52r.

The virtual displacement q1 after reflection of horsepower control is multiplied by the reference rotational speed N_0 by the multiplication section 52j and becomes a target flow rate Q1$d$, and the target flow rate Q1$d$ is converted into a target rotational speed N1$d$ by multiplication by 1/qmax1 by the gain 52$k$ and is further converted into an output Vinv1 to the inverter 160 by the table 52**$m$.

At this time, since the virtual displacement q1 after reflection of horsepower control of the main pump 102 of the fixed displacement type is limited to qbmr1_min as described above, the rotational speed N1$d$ is limited so as to be lower than the rotational speed N2$d$ of the main pump 202** of the fixed displacement type.

In this manner, in the case where SOC1<SOC2, namely, in the case where the SOC of the power storage device 170 is lower than the SOC of the power storage device 270, the flow rate of hydraulic fluid delivered from the main pump 102 that is driven by electric power supplied from the power storage device 170 is lower than the flow rate of hydraulic fluid delivered from the main pump 202 that is driven by electric power supplied from the power storage device 270.

Although the power consumption of the pump increases in proportion to the pressure×the flow rate and the pressure (pump pressure Ps) of the common hydraulic fluid supply line 305 is common and equal, since the flow rate of the main pump 102 is lower than the flow rate of the main pump 202 as described above, the power consumption of the main pump 102 becomes lower than the power consumption of the main pump 202.

Therefore, the electric power consumption of the power storage device 170 from which electric power is supplied to the main pump 102 becomes lower than the electric power consumption of the power storage device 270 from which electric power is supplied to the main pump 202.

Since the electric power consumption of the power storage device 170 from which electric power is supplied to the main pump 102 is lower than the electric power consumption of the power storage device 270 from which electric power is supplied to the main pump 202, the rate at which the SOC1 of the power storage device 170 decreases becomes lower than the rate at which the SOC2 of the power storage device 270 decreases, and this continues until after the SOC1 and the SOC2 become equal to each other.

If SOC1=SOC2 is satisfied, then operation same as that in the case of (a) is performed.

~Advantage~

According to the present embodiment, the following advantages are obtained.

Since the hydraulic drive system is configured such that it includes, in addition to the main pump 102, electric motor 101, and power storage device 170, the main pump 202, electric motor 201, power storage device 270, and the common hydraulic fluid supply line 305 in which hydraulic fluids delivered from the main pumps 102 and 202 are merged and the merged hydraulic fluid is supplied to the plurality of flow control valves 6$a$, 6$b$, 6$c$, 6$d$, 6$e$, 6$f$, 6$g$, and 6$h$ and further supplied to the plurality of actuators 3$a$, 3$b$, 3$c$, 3$d$, 3$e$, 3$f$, 3$g$, and 3$h$, the rated voltages of various electric equipment such as a power storage device can be made common to that of an electrically-driven hydraulic work machine that requires lower horsepower.

Further, the hydraulic drive system includes the virtual limitation torque calculation section 51 and the variable horsepower control tables 52$r$ and 53$r$ and, in the case where the charge state of one of the power storage devices 170 and 270 becomes lower than the charge state of the other one of the power storage devices 170 and 270, the limit value q1*limit (q2*limit) of the virtual displacement is changed such that the charge state of the power storage device 170 and the charge state of the power storage device 270 become equal to each other thereby to suppress the power consumption of the hydraulic pump whose charge state is lower. Therefore, even in the case where there is a difference between the machine efficiencies of the main pumps 102 and 202 or between the efficiencies of such electric equipment as the inverters 160 and 260 or the step-up/step-down choppers 161 and 261, or even in the case in which there is a difference between the electric power consumption amounts or the charge state characteristics of the power storage devices 170 and 270, the difference gradually decreases while the charge states of the power storage devices 170 and 270 are controlled so as to become equal to each other. Therefore, it is prevented that the power storage situation of only one of the power storage devices 170 and 270 decreases significantly, and the period of time within which the actuators of the electrically-driven hydraulic work machine obtain a predetermined speed.

It is to be noted that, while, in the embodiment described above, the two tables of the first and second tables 51$d$ and 51$e$ and the two motor rotational speed control sections of the electric motor rotational speed control sections 52 and 53 are provided in the virtual limitation torque calculation section 51 of the controller 50 and the limit value q1*limit or the limit value q2*limit (first or second allowable value) is changed such that, even in the case where the charge state of one of the two power storage devices 170 and 270 becomes lower than the charge state of the other power storage device, the charge state of the power storage device 170 and the charge state of the power storage device 270 become equal to each other, only one of the first and second tables 51$d$ and 51$e$ (for example, the first table 51$d$) and a corresponding one of the electric motor rotational speed control sections 52 and 53 (for example, the electric motor rotational speed control section 52) may be provided and the limit value q1*limit (first allowable value) may be changed such that, only in the case where the charge state of one (for example, the power storage device 270) of the two power storage devices 170 and 270 becomes lower than the charge state of the other power storage device (for example, the power storage device 170), the charge state of the power storage device 170 and the power storage device of the power storage device 270 become equal to each other. Also this makes it possible to prevent that the charge state of one (for example, the power storage device 270) of the power storage devices 170 and 270 becomes significantly lower than the charge state of the other one (for example, the power storage device 170), and the period of time within which the actuators of the electrically-driven hydraulic work machine can obtain a predetermined speed can be extended.

~Modifications to the Characteristic of the First and Second Tables 51$d$ and 51$e$~

Figure 12B:
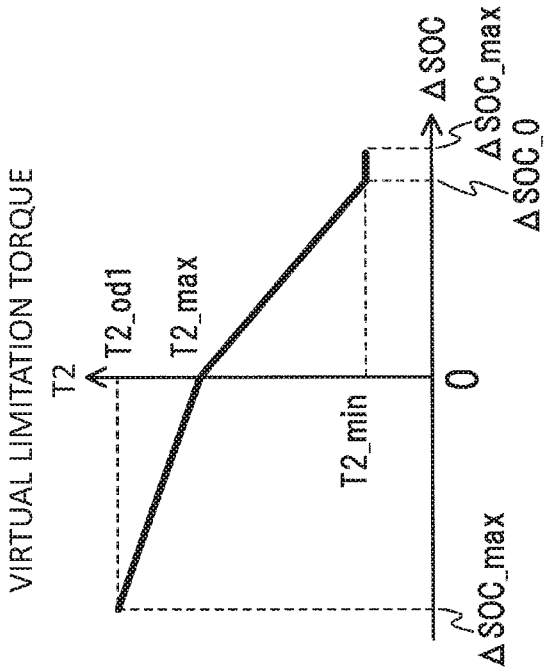
FIG. 12B is a view depicting a modification to the characteristic of the second table of the virtual torque calculation section.
Figure 12A:
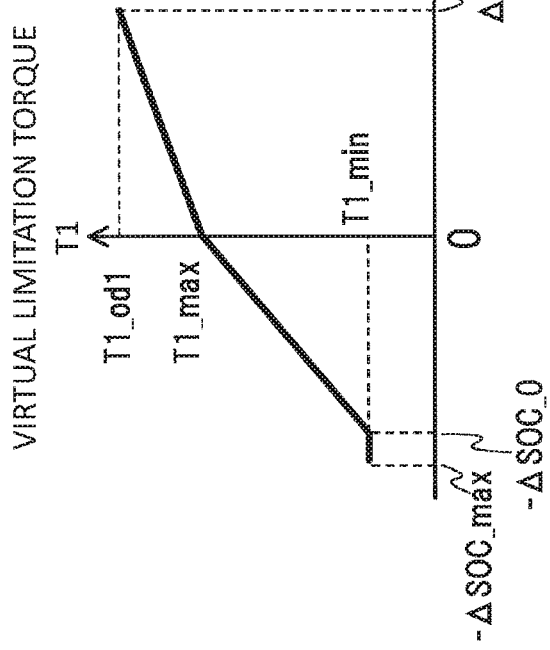
FIG. 12A is a view depicting a modification to the characteristic of the first table of the virtual torque calculation section.

FIGS. 12A and 12B depict a first modification to the characteristic of the tables 51$d$ and 51$e$.

While, in FIGS. 5A and 5B, the characteristic of the tables 51$d$ and 51$e$ is set such that a fixed value (maximum value T1_max) is outputted as the virtual limitation torque T1 when ΔSOC has a positive value (FIG. 5A) or when ΔSOC has a negative value (FIG. 5B), the virtual limitation torque T1 may otherwise be set such that, as ΔSOC increases (FIG. 12A) or decreases (FIG. 12B), the virtual limitation torque T1 further increases from a value equal to the maximum value T1_max to a value T1_od1. Consequently, in the case where the power storage device 170 and the power storage device 270 are different in SOC from each other, since not only the electric power consumption of the power storage device with a lower SOC decreases but also the electric power consumption of the power storage device with a greater SOC increases, the SOC1 of the power storage device 170 and the SOC2 of the power storage device 270 can be made equal to each other in a shorter period of time.

Figure 12C:
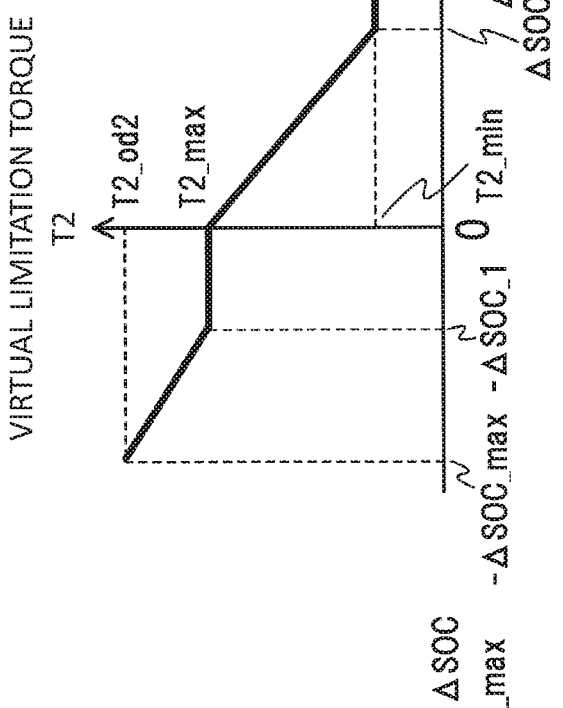
FIG. 12C is a view depicting another modification to the characteristic of the first table of the virtual torque calculation section.
Figure 12D:
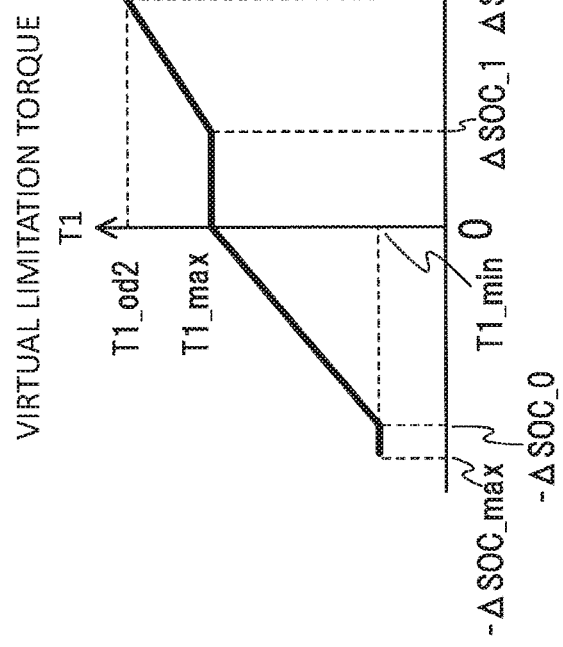
FIG. 12D is a view depicting another modification to the characteristic of the second table of the virtual torque calculation section.

A second modification to the characteristics of the tables 51d and 51e is depicted in FIGS. 12C and 12D.

While, in FIGS. 12A and 12B, the virtual limitation torque T1 is set such that, as ΔSOC increases from 0 (FIG. 12A) or decreases (FIG. 12B), the virtual limitation torque T1 further increases from a value equal to the maximum value T1_max to the value T1_od1, in FIGS. 12C and 12D, the virtual limitation torque T1 is set such that a dead zone of 0 to ΔSOC_1 (FIG. 12C) or 0 to -ΔSOC_1 (FIG. 12D) is provided and the virtual limitation torque T1 further increases from a value equal to the maximum value T1_max to the value T1_od1 when ΔSOC goes out of the dead zone. This increases the electric power consumption of the power storage device with a higher SOC only in the case where ΔSOC goes out of the dead zone, and the stability of control can be achieved.

Second Embodiment

~Structure~

Figure 8:
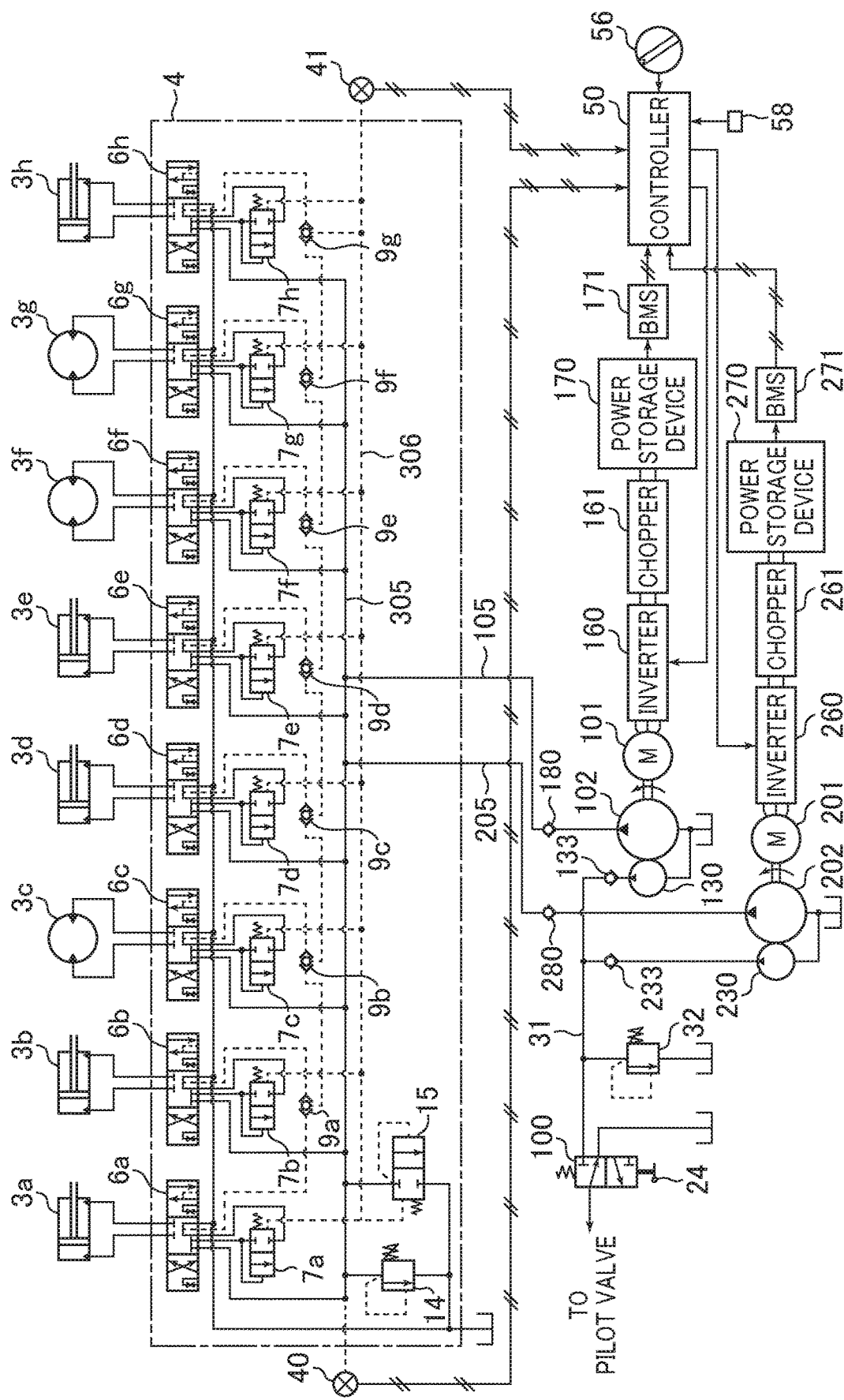
FIG. 8 is a view depicting a hydraulic drive system for an electrically-driven hydraulic work machine according to a second embodiment of the present invention.

FIG. 8 is a view depicting a hydraulic drive system of an electrically-driven hydraulic work machine (hydraulic excavator) according to a second embodiment of the present invention.

The hydraulic drive system of the present embodiment further includes, in addition to the configuration of the first embodiment depicted in FIG. 1, a check valve 180 (first check valve) that is provided in the hydraulic fluid supply line 105 of the main pump 102 of the fixed displacement type and blocks a flow of hydraulic fluid from the common hydraulic fluid supply line 305 to the main pump 102 of the fixed displacement type, and a check valve 280 (second check valve) that is provided in the hydraulic fluid supply line 205 of the main pump 202 of the fixed displacement type and blocks a flow of hydraulic fluid from the common hydraulic fluid supply line 305 to the main pump 202 of the variable displacement type.

Further, the hydraulic drive system of the present embodiment includes an inputting device 58 and is configured such that, in such a case where the SOC of one of the power storage devices 170 and 270 decreases significantly in comparison with the other SOC or in such a case where only one of the power storage devices 170 and 270 is used and the electric power stored in the other power storage device is preserved while the total operating time period is to be increased in place of suppressing the work amount of the hydraulic work machine to be low, when an operator operates the inputting device 58, then the controller 50 stops one of the electric motors 101 and 201 for driving the main pumps 102 and 202 of the fixed displacement type.

The structure of the other part is same as that of the first embodiment.

~Operation~

In the present embodiment configured in such a manner as described above, since the check valves 180 and 280 are provided in the hydraulic fluid supply lines 105 and 205, respectively, in the case where one of the electric motors 101 and 201 that respectively drive the main pumps 102 and 202 of the fixed displacement type is stopped, the pressure of the common hydraulic fluid supply line 305 is prevented from being applied to the delivery port of one of the main pumps 102 and 202 of the fixed displacement type which is being stopped.

Operation of the other part is same as that in the first embodiment.

~Advantage~

According to the present embodiment, the following advantage is achieved in addition to the advantages of the first embodiment.

In the case where the operator operates the inputting device 58 to stop one of the electric motors 101 and 201 for driving the main pumps 102 and 202 of the fixed displacement type, the check valves 180 and 280 prevent hydraulic fluid from leaking out from the main pump of the fixed displacement type in the stopping state to the tank, and power of the hydraulic fluid delivered from the main pump of the fixed displacement type in the driven state can be prevented from being lost wastefully by leak of the hydraulic fluid.

Third Embodiment

~Structure~

Figure 9:
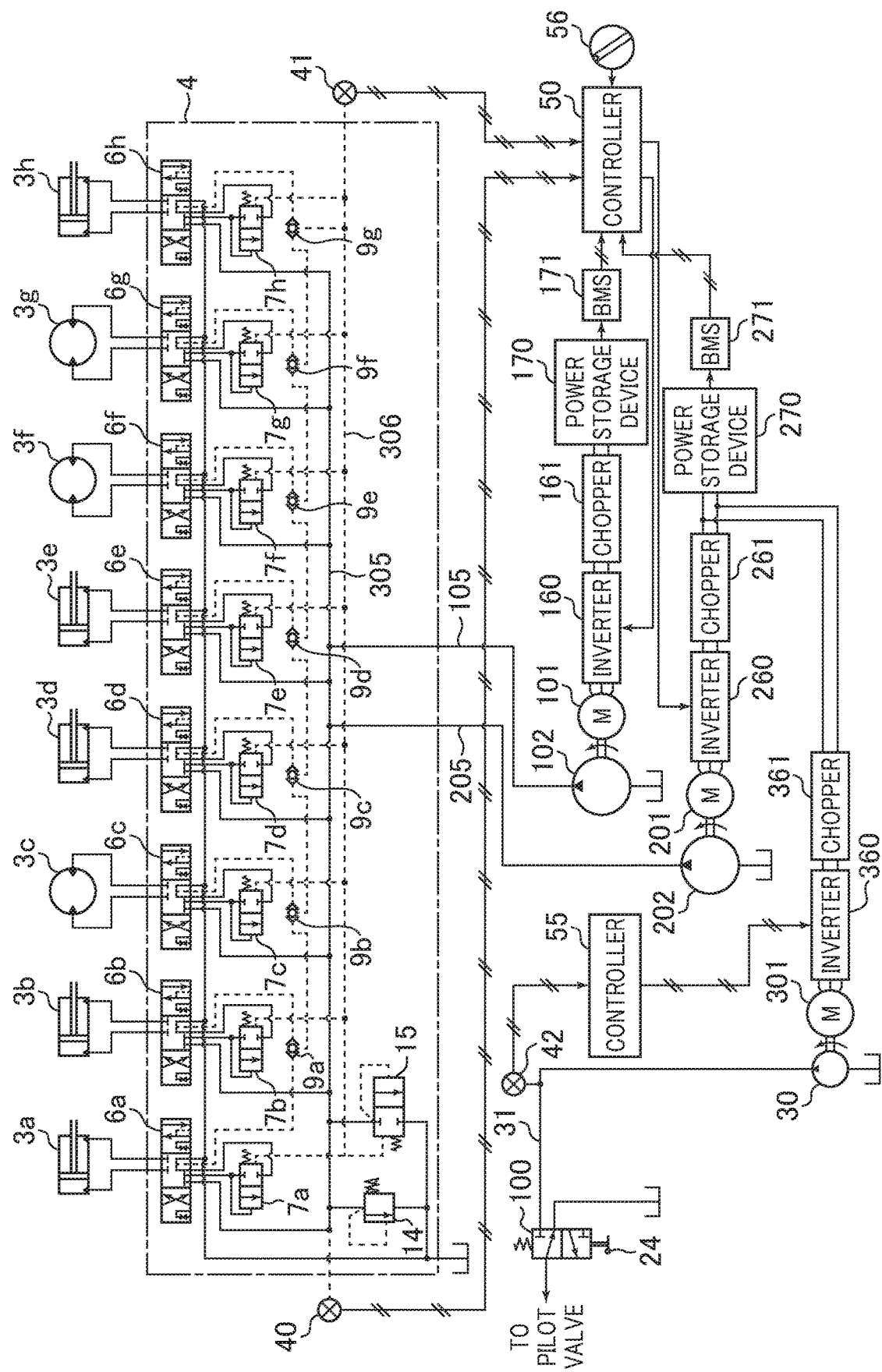
FIG. 9 is a view depicting a hydraulic drive system for an electrically-driven hydraulic work machine according to a third embodiment of the present invention.

FIG. 9 is a view depicting a hydraulic drive system of an electrically-driven hydraulic work machine (hydraulic excavator) according to a third embodiment of the present invention.

The hydraulic drive system of the present embodiment is configured such that it does not include the pilot pumps 130 and 230 of the fixed displacement type that are provided in the first embodiment and are driven by the electric motors 101 and 201 and the electric motors 101 and 201 drive only the main pumps 102 and 202 of the fixed displacement type.

Further, the hydraulic drive system of the present embodiment includes an electric motor 301 (third electric motor), a pilot pump 30 of fixed displacement type that is driven by the electric motor 301, an inverter 360 that controls the rotational speed of the electric motor 301, a step-up/step-down chopper 361 that supplies electric power with a fixed voltage to the inverter 360, a pressure sensor 42 that is provided in the hydraulic fluid supply line 31 of the pilot pump 30 and detects a pressure of the hydraulic fluid supply line 31, namely, a delivery pressure (hereinafter referred to suitably as pump pressure) of the pilot pump 30, and a controller 55 that generates a rotational speed instruction signal to the inverter 360 on the basis of a detection signal of the pressure sensor 42 to control the inverter 360.

Similarly as in the first embodiment, the power storage device 270 is configured so as to supply electric power to the electric motor 201 through the step-up/step-down chopper 261 and the inverter 260 and supply electric power also to the electric motor 301 through the step-up/step-down chopper 361 and the inverter 360.

Hydraulic fluid delivered from the pilot pump 30 of the fixed displacement type is supplied to the hydraulic fluid supply line 31. To the hydraulic fluid supply line 31, a gate lock valve 100 is connected which selects the pilot hydraulic fluid line on the downstream side so as to be connected to the hydraulic fluid supply line 31 or to the tank, and for the gate lock valve 100, a gate lock lever 24 is provided.

Figure 10:
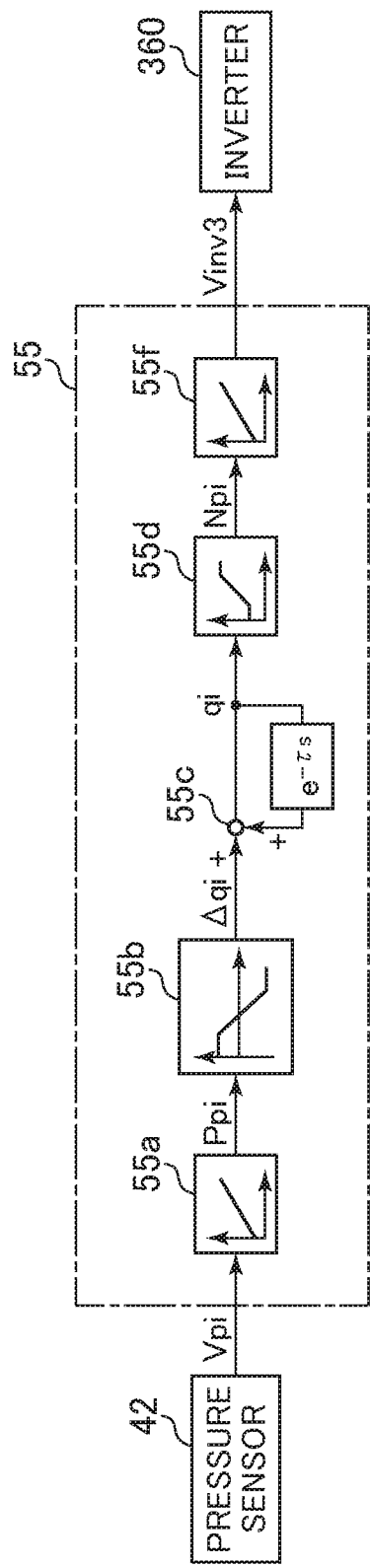
FIG. 10 is a block diagram depicting functions of a controller for a pilot pump.

FIG. 10 depicts a functional block diagram of the controller 55 in the third embodiment.

The controller 55 includes a table 55a, another table 55b, an addition section 55c, a further table 55d, and a still further table 55f.

If the output from the pressure sensor 42 is represented by Vpi, then the output Vpi is converted into a pressure (pilot primary pressure Ppi) of the hydraulic fluid supply line 31 by the table 55a and is converted into an increase/decrease amount Δqi of the virtual displacement qi of the pilot pump 30 by the table 55b.

Figure 11:
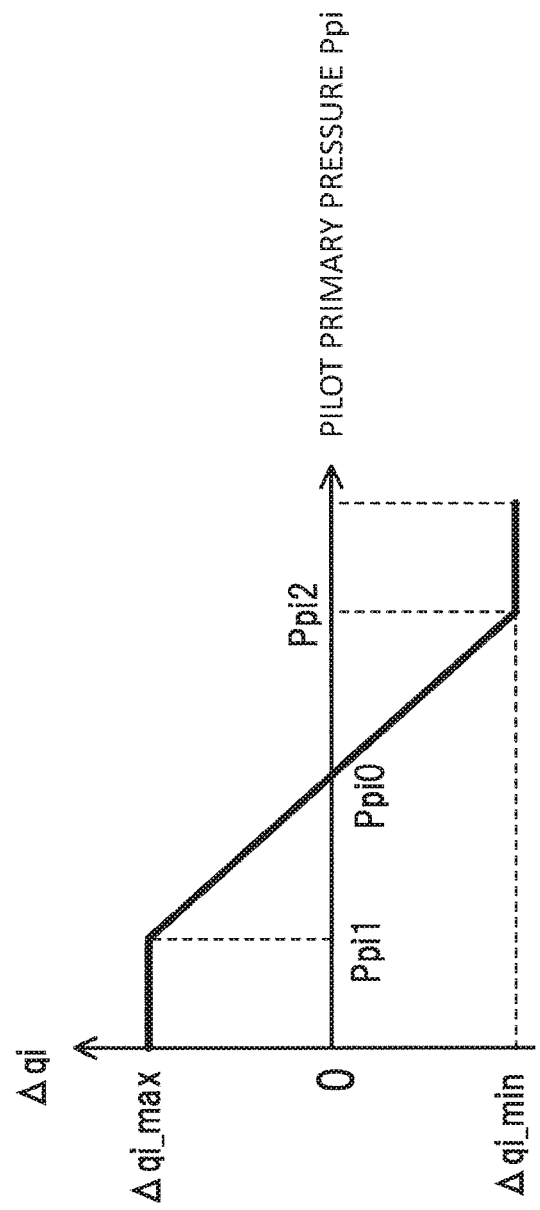
FIG. 11 is a view depicting a characteristic of a table for calculation of an increase/decrease amount of a virtual displacement of the controller for a pilot pump.

FIG. 11 depicts a characteristic of the table 55b.

The characteristic of the table 55b is configured such that, where the pilot primary pressure Ppi of a target is represented by Ppi0, when the pressure Ppi of the hydraulic fluid supply line 31 is lower than Ppi0, a positive value from 0 to Δqi_max is outputted as Δqi; when Ppi is higher than Ppi0, a negative value between Δqi_min and 0 is outputted as Δqi; and when Ppi is equal to Ppi0, Δqi=0 is outputted.

The virtual displacement increase/decrease amount Δqi of the pilot pump is added to a pilot pump virtual displacement qi before one control state by the addition section 55c to make a new pilot pump virtual displacement qi.

The pilot pump virtual displacement qi is configured so as to be converted into a target rotational speed Npi of the electric motor 301 by the table 55d, and further converted into an input Vinv3 to the inverter 360 by the table 55f, and then outputted to the inverter 360.

The structure of the other part is same as that of the first embodiment.

~Correspondence to Claims~

In the foregoing, the electric motor 301 is a third electric motor to which electric power is supplied by one of the power storage devices 170 and 270 (first and second power storage devices) to drive the pilot pump 30, and the controller 55 cooperates with the pressure sensor 42 and the inverter 360 to provide a pilot pump control device configured to control the rotational speed of the electric motor 301 (third electric motor) such that the pilot primary pressure Ppi generated by the pilot pump 30 becomes equal to a target pressure (target pilot primary pressure Ppi0).

~Operation~

Operation of the third embodiment is described below with reference to FIGS. 9, 10, and 11.

The rotational speed controlling function of the electric motors 101 and 201 for driving the main pumps 102 and 202 of the fixed displacement type is same as that of the first embodiment.

Also the function of controlling the virtual limitation torques T1 and T2 of the main pumps 102 and 202 of the fixed displacement type depending upon the charge states of the power storage devices 170 and 270, respectively, to control the charge states of the power storage devices 170 and 270 so as to eliminate an imbalance between the charge states.

The third embodiment is different from the first embodiment in that the pilot pump 30 of the fixed displacement type is driven independently by the electric motor 301 different from the electric motors 101 and 201 that respectively drive the main pumps 102 and 202 of the fixed displacement type.

In the following, operation of the present embodiment in rotational speed control of the electric motor 301 for driving the pilot pump 30 is described.

(a) Case where the Pressure of the Hydraulic Fluid Supply Line 31 is Lower than the Target Pilot Primary Pressure A case is considered in which the pressure (pilot primary pressure) of the hydraulic fluid supply line 31 is lower than the pilot primary pressure Ppi0.

As depicted in FIG. 10, Vpi inputted by the pressure sensor 42 is converted into a pilot primary pressure Ppi by the table 55a.

In the case where Ppi<Ppi0, from FIG. 11, the pilot pump virtual displacement increase/decrease amount Δqi has a positive value from 0 to Δqi_max.

The pilot pump virtual displacement increase/decrease amount Δqi is added to a pilot pump virtual displacement qi before one control step, and in the case where Ppi is lower than the target pilot primary pressure Ppi0 as described above, the virtual displacement qi gradually increases.

The increase continues until after the pilot primary pressure Ppi becomes equal to the pilot primary pressure Ppi0.

The pilot pump virtual displacement qi is converted into a target rotational speed Npi by the table 55d and into an output Vinv3 to the inverter 360 by the table 55f to control the rotational speed of the electric motor 301.

In particular, in the case where the pressure of the hydraulic fluid supply line 31 is lower than the target pilot primary pressure Ppi0, the electric motor 301 increases its rotational speed until after the pressure (pilot primary pressure) of the hydraulic fluid supply line 31 becomes equal to the target pilot primary pressure.

(b) Case where the Pressure of the Hydraulic Fluid Supply Line 31 is Higher than the Target Pilot Primary Pressure A case is considered in which the pressure (pilot primary pressure) of the hydraulic fluid supply line 31 is higher than the target pilot primary pressure Ppi0.

As depicted in FIG. 10, Vpi inputted by the pressure sensor 42 is converted into a pilot primary pressure Ppi by the table 55a.

In the case where Ppi>Ppi0, from FIG. 11, the pilot pump virtual displacement increase/decrease amount Δqi has a negative value between Δqi_min and 0.

The pilot pump virtual displacement increase/decrease amount Δqi is added to the pilot pump virtual displacement qi before one control step, and in the case where Ppi is higher than the pilot primary pressure Ppi0, the pilot pump virtual displacement qi gradually decreases as described hereinabove.

This decrease continues until after the pilot primary pressure Ppi becomes equal to the target pilot primary pressure Ppi0.

The pilot pump virtual displacement qi is converted into a target rotational speed Npi by the table 55d and into an output Vinv3 to the inverter 360 by the table 55f to control the rotational speed of the electric motor 301.

In particular, in the case where the pressure of the hydraulic fluid supply line 31 is higher than the target pilot primary pressure Ppi0, the electric motor 301 decreases its rotational speed until after the pressure (pilot primary pressure) of the hydraulic fluid supply line 31 becomes equal to the target pilot primary pressure.

As described in (a) and (b) above, the controller 55 controls the rotational speed of the electric motor 301 such that the pressure (pilot primary pressure) of the hydraulic fluid supply line 31 becomes equal to the target pilot primary pressure (Ppi0).

~Advantage~

According to the present embodiment, the following advantages are achieved in addition to the advantages of the first embodiment.

In the present embodiment, since the electric power consumed by the power storage device 270 is equal to the sum of the electric power consumption of the electric motor 201 for driving the main pump 202 of the fixed displacement type and the electric power consumption of the electric motor 301 for driving the pilot pump of the fixed displacement type, in comparison with the case of the first embodiment, the charge state of the power storage device 270 tends to decrease earlier than the charge state of the power storage device 170. However, similarly as in the first embodiment, in the case where the charge state of one of the power storage device (in the third embodiment, the power storage device 270) becomes lower than the charge state of the other power storage device (in the third embodiment, the power storage device 170), the rotational speed of the hydraulic pump (in the third embodiment, 202) that is driven by the electric motor to which electric power is supplied from the power storage device in the lower charge state (in the third embodiment, the power storage device 270) is limited and the electric power consumption of the electric motor is suppressed, and the charge states of the two power storage devices are controlled so as to become equal to each other again.

Therefore, similarly as in the first embodiment, since the charge state of one of the two power storage devices 170 and 270 is prevented from extremely unevenly being decreased, it can be prevented that the period of time within which the hydraulic work machine operates using the two power storage devices 170 and 270 decreases.

Fourth Embodiment

~Structure~

Figure 13:
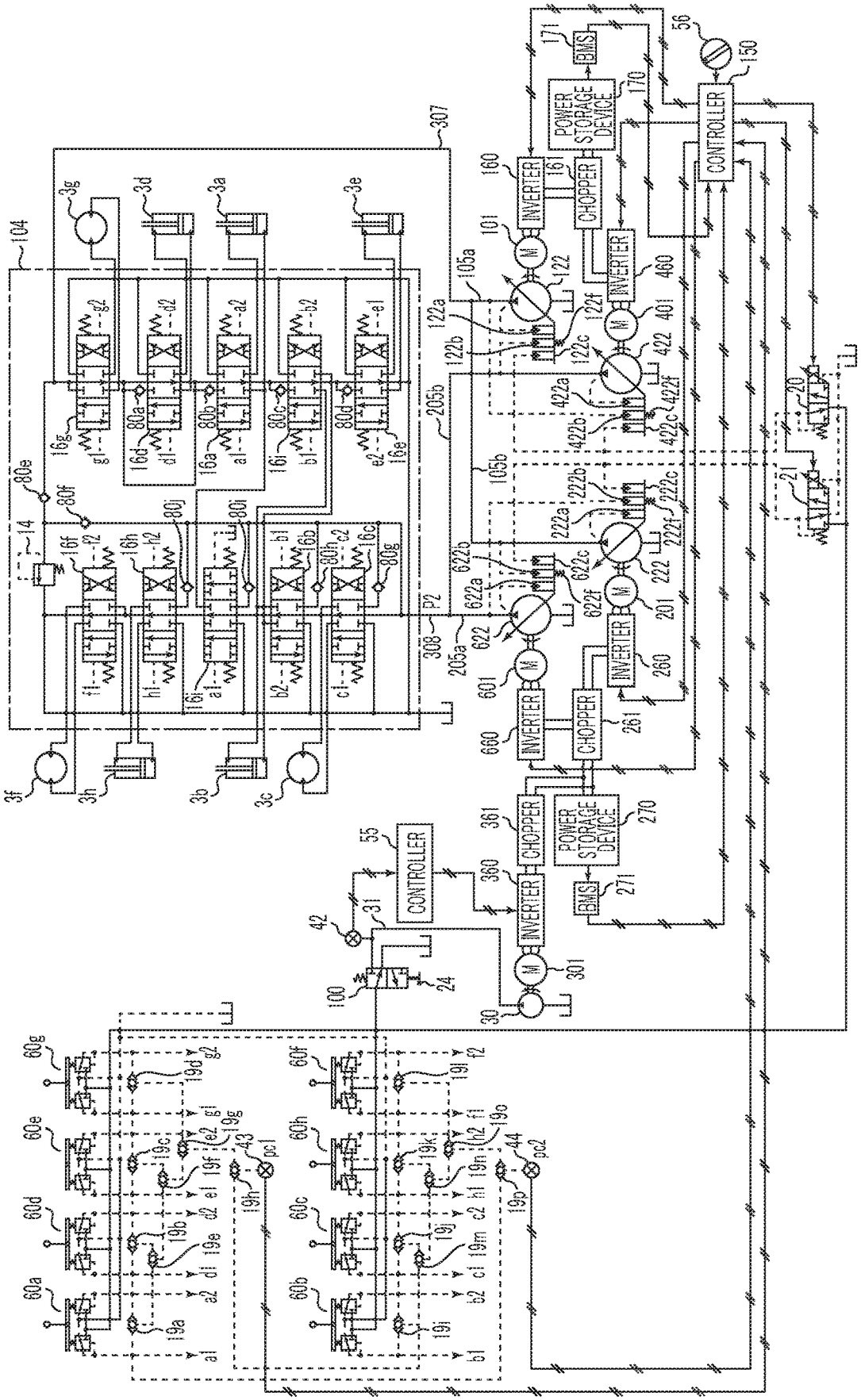
FIG. 13 is a view depicting a hydraulic drive system for an electrically-driven hydraulic work machine according to a fourth embodiment of the present invention.

FIG. 13 is a view depicting a hydraulic drive system of an electrically-driven hydraulic work machine (hydraulic excavator) according to a fourth embodiment of the present invention.

The hydraulic drive system of the present embodiment includes electric motors 101, 201, 401, and 601, main pumps 122, 222, 422 and 622 of the variable displacement type driven by the electric motors 101, 201, 401, and 601, respectively, an electric motor 301, a pilot pump 30 of the fixed displacement type driven by the electric motor 301, a boom cylinder 3a, an arm cylinder 3b, a swing motor 3c, a bucket cylinder 3d, a swing cylinder 3e, travel motors 3f and 3g, and a blade cylinder 3h that are a plurality of actuators driven by hydraulic fluids delivered from the main pumps 122, 222, 422, and 622 of the variable displacement type, hydraulic fluid supply lines 105a, 105b, 205a, and 205b for introducing hydraulic fluids delivered from the main pumps 122, 222, 422, and 622 of the variable displacement type into the plurality of actuators 3a, 3b, 3c, 3d, 3e, 3f, 3g, and 3h, a common hydraulic fluid supply line 307 that is connected to the hydraulic fluid supply lines 105a and 105b and in which hydraulic fluids delivered from the main pumps 122 and 222 (first and second hydraulic pumps) are merged, a common hydraulic fluid supply line 308 that is connected to the hydraulic fluid supply lines 205a and 205b and in which hydraulic fluids delivered from the main pumps 422 and 622 (first and second hydraulic fluid pumps) are merged, and a control valve block 104 that is provided on the downstream of the common hydraulic fluid supply lines 307 and 308 and to which hydraulic fluids delivered from the main pumps 122 and 222 and merged in the common hydraulic fluid supply line 307 and hydraulic fluids delivered from the main pumps 422 and 622 and merged in the common hydraulic fluid supply line 308 are introduced.

The control valve block 104 includes a plurality of directional selector valves 16a, 16d, 16e, 16g, and 16j that are connected to the common hydraulic fluid supply line 307 and control the directions and the flow rates of hydraulic fluids to be supplied to the plurality of actuators 3a, 3b, 3d, 3e, and 3g, a plurality of directional selector valves 16b, 16c, 16f, 16h and 16i that are connected to the common hydraulic fluid supply line 308 and control the directions and the flow rates of hydraulic fluids to be supplied to the plurality of actuators 3a, 3b, 3c, 3f, and 3h, check valves 80a, 80b, 80c, 80d, 80e, 80f, 80g, 80h, 80i, and 80j, and a main relief valve 14 that is provided on the downstream of the common hydraulic fluid supply lines 307 and 308 through the check valves 80e and 80f and controls the pressure of the common hydraulic fluid supply lines 307 and 308 so as not to become equal to or higher than a set pressure.

To the downstream of the common hydraulic fluid supply line 307, the directional selector valve 16g is connected on the most upstream, and the directional selector valves 16a and 16d are connected in parallel to each other to the downstream of the directional selector valve 16g through the check valves 80a and 80b, respectively. Further, the directional selector valves 16j and 16e are connected in tandem connection to the downstream of the directional selector valves 16a and 16d through the check valves 80c and 80d such that the directional selector valve 16j is positioned on the upstream side with respect to the directional selector valve 16e.

To the downstream of the common hydraulic fluid supply line 308, the directional selector valves 16c, 16b, 16i, and 16h are connected in parallel to each other through the check valves 80g, 80h, 80i, and 80j, respectively, and the directional selector valve 16f is connected in tandem connection to the downstream of the directional selector valve 16h.

The plurality of the directional selector valves 16a, 16d, 16e, 16g, and 16j and the plurality of directional selector valves 16b, 16c, 16f, 16h and 16i are of the open center type, and the main pumps 122 and 222 and main pumps 422 and 622 and the control valve block 104 configure a hydraulic drive system of an open circuit.

The main pumps 122, 222, 422, and 622 of the variable displacement type include regulator pistons 122a, 222a, 422a, and 622a for reducing, when the delivery pressure thereof becomes high, the displacement thereof to limit the torque, respectively.

Further, the main pump 122 and the main pump 422 include regulator pistons 122b and 422b, respectively, for reducing, if the delivery pressure of one of them becomes high, the displacement of the main pump of the other of them to limit the torque, and the main pump 222 and the main pump 622 include regulator pistons 222b and 622b for restricting, if the delivery pressure of one of them becomes high, the displacement of the main pump of the other of them to limit the torque.

The main pumps 122, 222, 422, and 622 have springs 122f, 222f, 422f, and 622f for setting a limitation value q1*limit, a limitation value q2*limit, a limitation value q3*limit, and a limitation value q4*limit for the absorption horsepower, respectively.

Furthermore, the main pumps 122 and 422 include regulator pistons 122c and 422c for reducing the displacement of them by an external pressure (output pressure of a proportional solenoid valve 20 hereinafter described) to reduce the torque, and the main pumps 222 and 622 include regulator pistons 222c and 622c for reducing the displacement of them by an external pressure (output pressure of a proportional solenoid valve 21 hereinafter described) to reduce the torque.

Further, the hydraulic drive system of the present embodiment includes a hydraulic fluid supply line 31 to which hydraulic fluid delivered from the pilot pump 30 of the fixed displacement type is introduced, a gate lock valve 100 that is connected to the hydraulic fluid supply line 31 and performs selection in regard to whether the pilot hydraulic fluid line on the downstream side is to be connected to the hydraulic fluid supply line 31 or the tank, and a gate lock lever 24 disposed on the operator's seat entrance side of the hydraulic work machine for performing a selection operation of the gate lock valve 100.

The pilot hydraulic fluid line on the downstream side of the gate lock valve 100 is connected to a plurality of pilot valves 60a, 60b, 60c, 60d, 60e, 60f, 60g, and 60h provided on a plurality of operation devices 522, 523, 524a, 524b, . . . (refer to FIG. 2), and the plurality of pilot valves 60a, 60b, 60c, 60d, 60e, 60f, 60g, and 60h generate a pilot operation pressure according to an operation amount based on hydraulic fluid of the pilot hydraulic fluid line on the downstream side of the gate lock valve 100, and the plurality of directional selector valves 16a, 16b, 16c, 16d, 16e, 16f, 16g, 16h, 16i, and 16j are controlled for selection by the pilot operation pressure.

The hydraulic drive system of the present embodiment further includes inverters 160, 260, 460, and 660 for controlling the rotational speeds of the electric motors 101, 201, 401, and 601, a step-up/step-down chopper 161 for supplying electric power with a fixed voltage to the inverters 160 and 460, another step-up/step-down chopper 261 for supplying electric power with a fixed voltage to the inverters 260 and 660, an inverter 360 for controlling the rotational speed of the electric motor 301, a step-up/step-down chopper 361 for supplying electric power with a fixed voltage to the inverter 360, a power storage device 170 (first power storage device) connected so as to supply electric power to the electric motors 101 and 401 (first electric motors) through the step-up/step-down choppers 161 and the inverters 160 and 460, a power storage device 270 (second power storage device) connected so as to supply electric power to the electric motors 201 and 601 (second electric motors) through the step-up/step-down chopper 261 and the inverters 260 and 660 and connected so as to supply electric power to the electric motor 301 through the step-up/step-down chopper 361 and the inverter 360, battery management systems (BMS) 171 and 271 that output information such as a voltage, a temperature, and so forth of the power storage devices 170 and 270 to a controller 150 hereinafter described, a reference rotational speed instruction dial 56 for instructing a maximum speed of the plurality of actuators 3a to 3h, shuttle valves 19a, 19b, 19c, 19d, 19e, 19f, 19g, and 19h that select and output the highest pressure from among output pressures of the pilot valves 60a, 60b, 60d, 60e, and 60g, a pressure sensor 43 that detects the selected highest pressure, shuttle valves 19i, 19j, 19k, 19l, 19m, 19n, 19o, and 19p that select and output the highest pressure from among output pressures of the pilot valves 60a, 60b, 60c, 60h, and 60f, a pressure sensor 44 that detects the selected highest pressure, a pressure sensor 42 that is provided in the hydraulic fluid supply line 31 of the pilot pump 30 and detects a pressure of the hydraulic fluid supply line 31, namely, a delivery pressure (hereinafter referred to suitably as pump pressure) of the pilot pump 30, a proportional solenoid valve 20 that is connected to the pilot hydraulic fluid line on the downstream side of the gate lock valve 100 and decreases the pressure of the hydraulic fluid supply line 31, to which hydraulic fluid is delivered from the pilot pump 30 of the fixed displacement type, to generate a torque controlling pressure to be introduced to the regulator pistons 122c and 422c, a proportional solenoid valve 21 that decreases the pressure of the hydraulic fluid supply line 31 to generate a torque controlling pressure to be introduced to the regulator pitons 222c and 622c, a controller 150 that receives signals from the battery management systems 171 and 271, reference rotational speed instruction dial 56, and pressure sensors 43 and 44 as inputs thereto to generate rotational speed instruction signals for the inverters 160, 260, 460, and 660 and control signals for the proportional solenoid valves 20 and 21 from the input information to control the inverters 160, 260, 460, and 660 and the proportional solenoid valves 20 and 21, and another controller 55 that generates a rotational speed instruction signal for the inverter 360 on the basis of a detection signal of the pressure sensor 42 to control the inverter 360.

Figure 14:
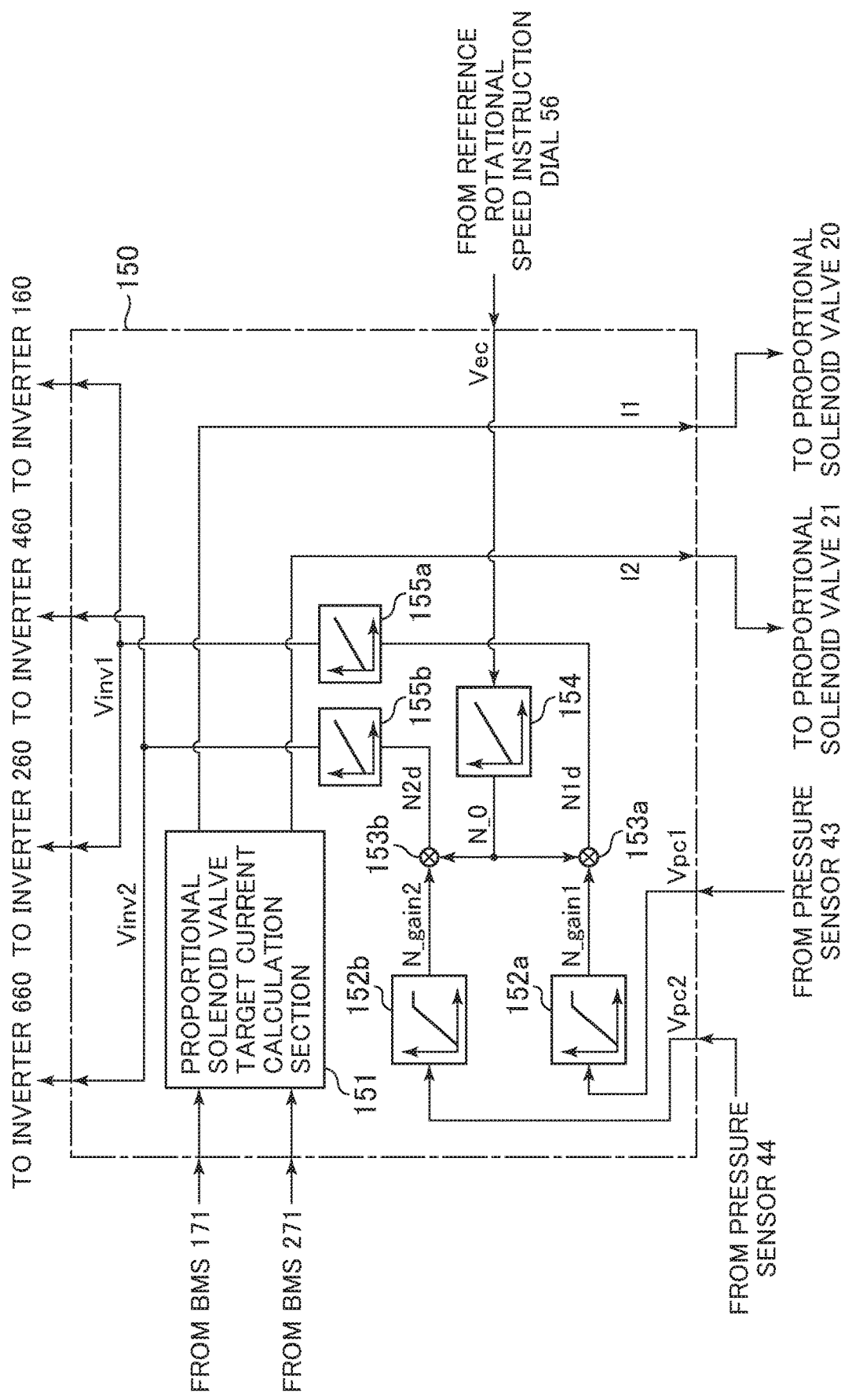
FIG. 14 is a block diagram depicting functions of the controller.

FIG. 14 depicts a functional block diagram of the controller 150 in the fourth embodiment.

The controller 150 includes a proportional solenoid valve target current calculation section 151, gain tables 152a and 152b, multiplication sections 153a and 153b, a rotational speed instruction value table 154, and command value tables 155a and 155b.

Outputs of the battery management systems 171 and 271 are inputted to the proportional solenoid valve target current calculation section 151, and an output of the proportional solenoid valve target current calculation section 151 is outputted to the proportional solenoid valves 20 and 21.

Meanwhile, a maximum operation pilot pressure of the boom cylinder 3a, arm cylinder 3b, bucket cylinder 3d, swing cylinder 3e and right travel motor 3g is inputted to the controller 150 through the pressure sensor 43, and a maximum operation pilot pressure of the boom cylinder 3a (in the raising direction only), arm cylinder 3b, swing motor 3c, blade cylinder 3h and left travel motor 3f is inputted to the controller 150 through the pressure sensor 44.

Outputs from the pressure sensors 43 and 44 are inputted to the gain tables 152a and 152b, by which they are converted into gains N_gain1 and N_gain2 within a range of 0 to 100%, respectively. Further, an output from the reference rotational speed instruction dial 56 is converted into a reference rotational speed N_0 by the rotational speed instruction value table 154.

The reference rotational speed N_0 that is an output of the rotational speed instruction value table 154 is multiplied by the gains N_gain1 and N_gain2 by the multiplication sections 153a and 153b to obtain target rotational speeds N1d and N2d for the inverters 160 and 260 and the inverters 460 and 660, respectively.

The target rotational speeds N1d and N2d are inputted to the command value tables 155a and 155b and converted into command values Vinv1 and Vinv2 for the inverters 160 and 260 and the inverters 460 and 660, respectively, and they are outputted to the inverters 160 and 260 and the inverters 460 and 660.

Figure 15:
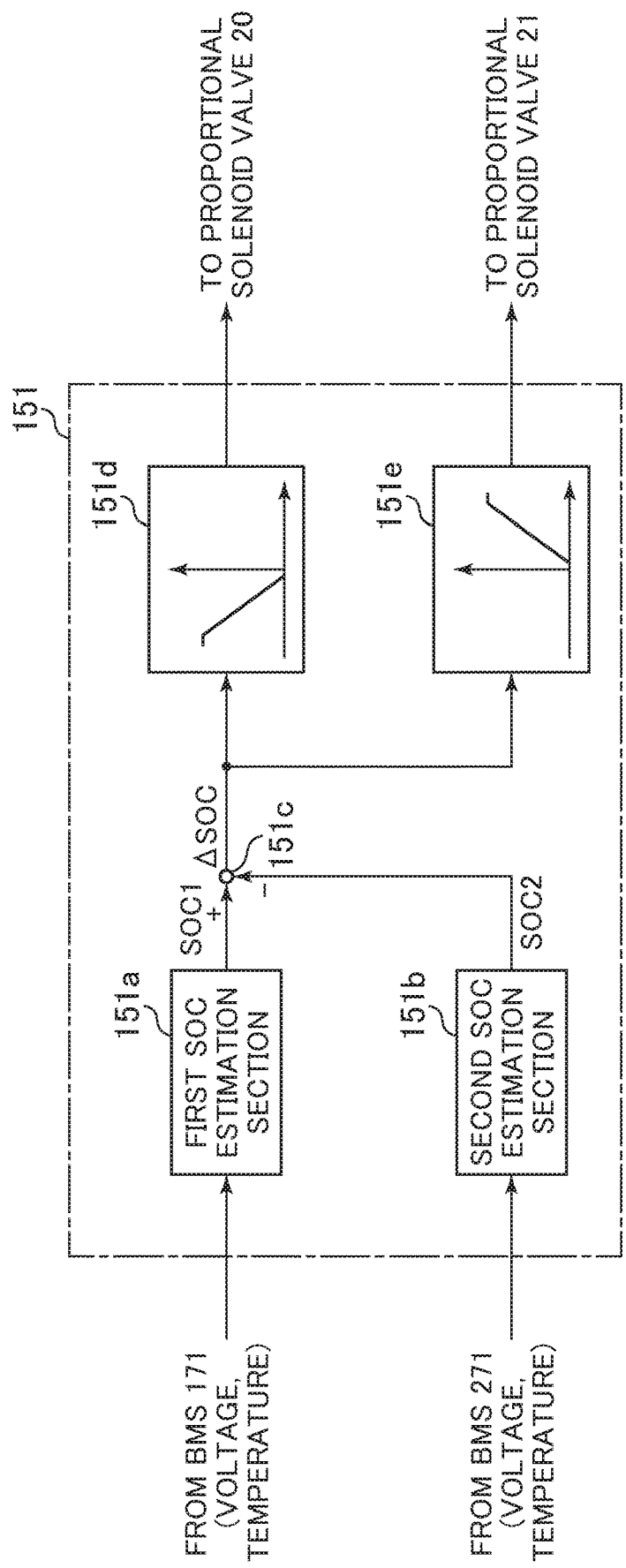
FIG. 15 is a block diagram depicting a function of a proportional solenoid valve target current calculation section of the controller.

FIG. 15 depicts a functional block diagram of the proportional solenoid valve target current calculation section 151 in the controller 150 in the fourth embodiment.

The proportional solenoid valve target current calculation section 151 includes first and second SOC estimation sections 151a and 151b, a differentiation section 151c, and first and second tables 151d and 151e.

Information (a voltage, a temperature and so forth) from the battery management systems 171 and 271 is inputted to the first and second SOC estimation sections 151a and 151b indicative of charge states of the power storage devices 170 and 270, and a SOC1 and a SOC2 are outputted as SOCs of the first and second SOC estimation sections 151a and 151b, respectively. The SOC1 and the SOC2 are differentiated by the differentiation section 151c to obtain ΔSOC (=SOC1−SOC2). The difference ΔSOC is inputted to the first and second tables 151d and 151e, by which they are converted into target currents I1 and I2 (horsepower control amounts), which are outputted to the proportional solenoid valves 20 and 21.

Figure 16A:
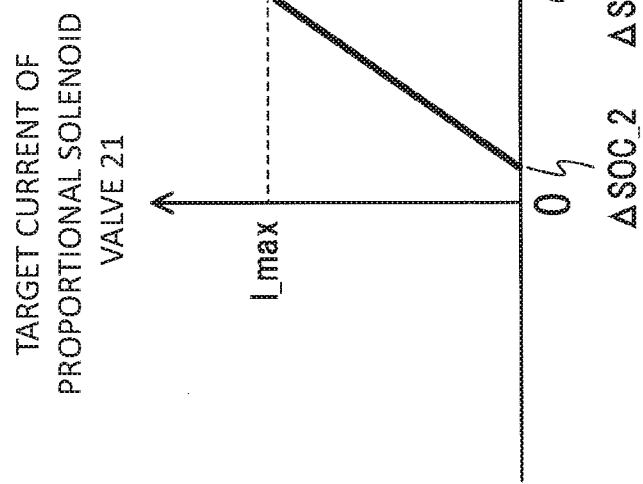
FIG. 16A is a view depicting a characteristic of a first table of the proportional solenoid valve target current calculation section.
Figure 16B:
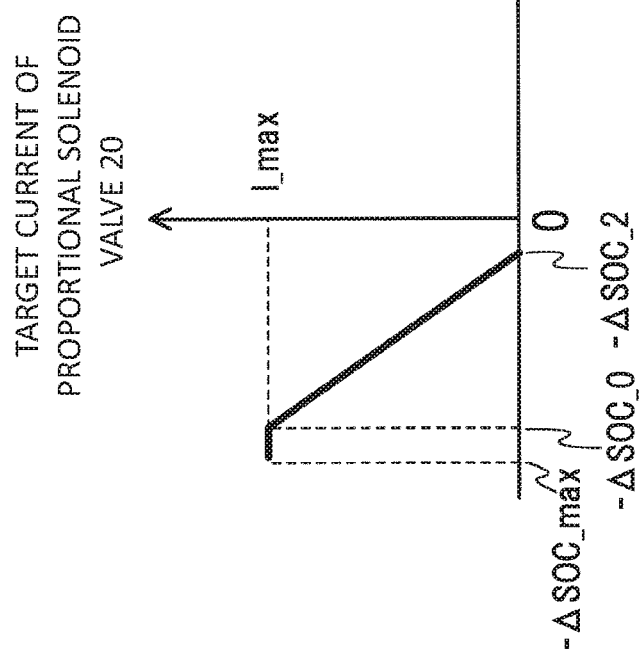
FIG. 16B is a view depicting a characteristic of a second table of the proportional solenoid valve target current calculation section.

FIGS. 16A and 16B depict characteristics of the first and second tables 151d and 151e.

As depicted in FIG. 16A, the characteristic of the first table 151d is set such that, when ΔSOC has a positive value, 0 is outputted as the target current I1 of the proportional solenoid valve 20, and when ΔSOC has a negative value, as ΔSOC decreases from the dead zone −ΔSOC_2, the target current I1 of the proportional solenoid valve 20 increases, and when ΔSOC reaches −ΔSOC_0 in the proximity of the maximum value −ΔSOC_max, a maximum value I_max is outputted as the target current I1.

As depicted in FIG. 16B, the characteristic of the second table 151e is set reverse to the characteristic of the first table 151d. In particular, the characteristic of the second table 151e is set such that, when ΔSOC has a negative value, 0 is outputted as the target current I2 of the proportional solenoid valve 21, and when ΔSOC has a positive value, as ΔSOC increases from the dead zone ΔSOC_2, the target current I2 of the proportional solenoid valve 21 increases, and when ΔSOC reaches ΔSOC_0 in the proximity of the maximum value ΔSOC_max, a maximum value I_max is outputted as the target current I2.

Figure 17:
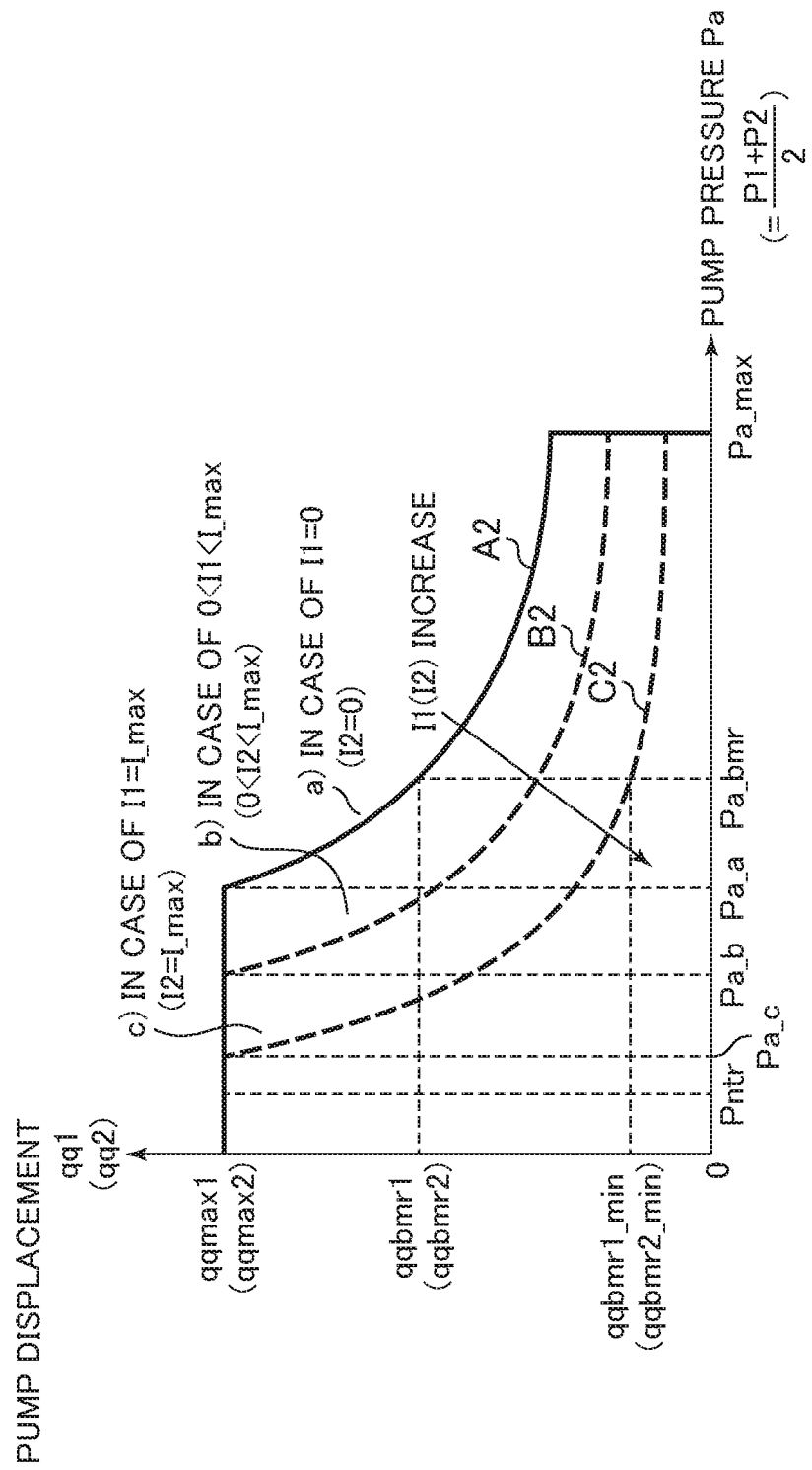
FIG. 17 is a view depicting a horsepower control characteristic by a regulator piston of a main pump of variable displacement type.

FIG. 17 depicts a horsepower control characteristic by the regulator pistons 122a and 422a, regulator pistons 122b and 422b, and regulator pistons 122c and 422c of the main pumps 122 and 422 of the variable displacement type. Further, in FIG. 17, a horsepower control characteristic by the regulator pistons 222a and 622a, regulator pistons 222b and 622b, and regulator pistons 222c and 622c of the main pumps 222 and 622 of the variable displacement type is depicted in parentheses.

The axis of abscissa of FIG. 17 depicts an average value Pa (=P1+P2/2) of delivery pressures P1 and P2 of the main pumps 122 and 422, and a characteristic indicated by a solid line A2 is a characteristic when the target current I1 of the proportional solenoid valve 20 is 0 and the output pressure of the proportional solenoid valve 20 is 0. The regulator pistons 122a, 422a, 122b, and 422b have a characteristic that, after the average value Pa of the delivery pressures P1 and P2 exceeds Pa_a, as it becomes higher, the displacement qq1 of the main pumps 122 and 422 decreases.

Further, as the target current I1 of the proportional solenoid valve 20 increases and the output pressure of the proportional solenoid valve 20 becomes higher, the horsepower control characteristic becomes such a characteristic that it varies as indicated with a broken line B2 or C2 as indicated by an arrow mark in FIG. 17 to increase the degree of the limitation stronger and the displacement qq1 of the main pumps 122 and 422 decreases.

This similarly applies also to the horsepower control characteristics by the regulator pistons 222a and 622a, regulator pistons 222b and 622b, and regulator pistons 222c and 622c of the main pumps 222 and 622 of the variable displacement type indicated in parentheses in FIG. 17.

~Correspondence to Claims~

In the foregoing, the main pumps 122 and 222 (or 422 and 622) of the variable displacement type are first and second hydraulic pumps, and hydraulic fluids delivered from the first and second hydraulic pumps are merged in the common hydraulic fluid supply line 307 (or 308) and supplied to the plurality of flow control valves 16a, 16b, 16d, 16e, and 16g (or 16a, 16b, 16c, 16f, and 16h) and further supplied to the plurality of actuators 3a, 3b, 3d, 3e, 3f, and 3g (or 3a, 3b, 3d, 3e, and 3g).

The electric motors 101 and 201 (or 401 and 601) are first and second electric motors that drive the main pumps 122 and 222 (or 422 and 622) (first and second hydraulic pumps), respectively, and the power storage devices 170 and 270 are first and second power storage devices that supply electric power to the electric motors 101 and 201 (or 401 and 601) (first and second motors), respectively.

The regulator piston 122a (or 422a) provides a first horsepower control device configured to decrease, when the delivery pressure of the main pump 122 (or 422) (first hydraulic pump) increases, the delivery flow rate of the main pump 122 (or 422) (first hydraulic pump) to control the absorption horsepower of the main pump 122 (or 422) (first hydraulic pump) so as not to exceed the limitation value q1*limit (first allowable value), and the regulator piston 222a (or 622a) provides a second horsepower control device configured to decrease, when the delivery pressure of the main pump 222 (or 622) (second hydraulic pump) increases, the delivery flow rate of the main pump 222 (or 622) (second hydraulic pump) to control the absorption horsepower of the main pump 222 (or 622) (second hydraulic pump) so as not to exceed the limitation value q2*limit (second allowable value).

The proportional solenoid valve target current calculation section 151 cooperates with the battery management systems 171 and 271 to provide a horsepower distribution control section configured to change at least one of the limitation value q1*limit (first allowable value) and the limitation value q2*limit (second allowable value) of the first and second horsepower control devices such that the charge state of the power storage device 170 (first power storage device) and the charge state of the power storage device 270 (second power storage device) become equal to each other.

Further, in the present embodiment, the main pumps 122 and 222 (or 422 and 622) are hydraulic pumps of the variable displacement type, and the first horsepower control device are configured to control the displacements of the main pump 122 (or 422) (first hydraulic pump) and the main pump 222 (or 622) (second hydraulic pump) to control the absorption horsepower of the main pumps 122 and 222 (or 422 and 622) (first and second hydraulic pumps) such that the absorption horsepower of the main pump 122 (or 422) (first hydraulic pump) does not exceed the limitation value q1*limit (first allowable value) and the absorption horsepower of the main pump 222 (or 622) (second hydraulic pump) does not exceed the limitation value q2*limit (second allowable value).

The gain table 152a (152b), multiplication section 153a (153b), rotational speed instruction value table 154, command value table 155a (155b), and inverter 160 (or 460) provide a first flow control section configured to perform when at least one of the operation devices 522, 523, 524a, 524b, . . . is operated, positive flow control for controlling the delivery flow rate of the main pump 122 (or 422) (first hydraulic pump) as the required flow rate by the operation device increases, and the gain table 152a (152b), multiplication section 153a (153b), rotational speed instruction value table 154, command value table 155a (155b), and inverter 260 (or 660) provide a second flow control section configured to perform when at least one of the plurality of operation devices 522, 523, 524a, 524b, . . . is operated, positive flow control for controlling the delivery flow rate of the main pump 222 (or 622) (second hydraulic pump) as the required flow rate by the operation device increases.

The first and second flow control sections described above are configured to control the rotational speeds of the main pumps 122 and 222 (or 422 and 622) (first and second hydraulic pumps) respectively to control the delivery flow rates of the main pumps 122 and 222 (or 422 and 622) (first and second hydraulic pumps) as the required flow rate increases, and the first and second horsepower control devices are configured to control the delivery flow rates of the main pumps 122 and 222 (or 422 and 622) (first and second hydraulic pumps) respectively, which are controlled by positive flow control, such that the absorption horsepower of the main pump 122 (or 422) (first hydraulic pump) does not exceed the limitation value q1*limit (or q3*limit) (first allowable value) and the absorption horsepower of the main pump 222 (or 622) (second hydraulic pump) does not exceed the limitation value q2*limit (or q4*limit).

The battery management system 171 and the first SOC estimation section 151a in the proportional solenoid valve target current calculation section 151 of the controller 150 provide a first charge state estimation section configured to estimate the storage state of the power storage device 170 (first power storage device), and the battery management system 271 and the second SOC estimation section 151b in the proportional solenoid valve target current calculation section 151 of the controller 150 provide a second charge state estimation section configured to estimate the charge state of the power storage device 270 (second power storage device).

The differentiation section 151c in the proportional solenoid valve target current calculation section 151 of the controller 150 and the first and second tables 151d and 151e provide a horsepower control amount calculation section configured to calculate, when the charge state of the power storage device 170 (first power storage device) estimated by the first charge state estimation section is lower than the charge state of the power storage device 270 (second power storage device) estimated by the second charge state estimation section, a target current I1 (first horsepower control amount) of the proportional solenoid valve 20 for decreasing the absorption horsepower of the main pump 122 (or 422) (first hydraulic pump), and calculate, when the charge state of the power storage device 270 (second power storage device) estimated by the second charge state estimation section is lower than the charge state of the power storage device 170 (first power storage device) estimated by the first charge state estimation section, a target current I2 (second horsepower control amount) of the proportional solenoid valve 21 for decreasing the absorption horsepower of the main pump 222 (or 622) (second hydraulic pump).

The proportional solenoid valve 20 and the regulator piston 122c (or 422c) of the main pump 122 (or 422) provide a first allowable value changing section configured to change the limitation value q1*limit (or q3*limit) (first allowable value) of the first horsepower control device on the basis of the target current I1 (first horsepower control amount) of the proportional solenoid valve 20 calculated by the horsepower control amount calculation section. The proportional solenoid valve 21 and the regulator piston 222c (or 622c) of the main pump 222 (or 622) provide a second allowable value changing section configured to change the limitation value q2*limit (or q4*limit) (second allowable value) of the second horsepower control device on the basis of the target current I2 (second horsepower control amount) of the proportional solenoid valve 21 calculated by the horsepower control amount calculation section.

~Operation~

Operation of the fourth embodiment is described with reference to FIGS. 12 to 17.

Similarly as in the third embodiment, the pressure of the hydraulic fluid supply line 31 is kept at the pilot primary pressure Ppi0 by controlling the rotational speed of the electric motor 301 for driving the pilot pump 30 of the fixed displacement type.

(a) Case where the SOCs of the Power Storage Device 170 and the Power Storage Device 270 are Equal to Each Other FIG. 15 depicts a functional block diagram of the proportional solenoid valve target current calculation section 151.

First, in the case where the charge state SOC1 of the power storage device 170 estimated by the first SOC estimation section 151a and the charge state SOC2 of the power storage device 270 estimated by the second SOC estimation section 151b are equal to each other, since SOC1=SOC2 is satisfied, ΔSOC computed by the differentiation section 151c becomes ΔSOC=SOC1−SOC2=0, and since the current commands to the proportional solenoid valves 20 and 21 become 0 from the characteristics of the tables 151d and 151e depicted in FIG. 16, the displacement of the main pumps 122 and 422 becomes qqmax1 and the displacement of the main pumps 222 and 622 become qqmax2 as depicted in FIG. 17.

<(a-1) Case where all Operation Levers are Neutral>

As described hereinabove, since a maximum operation pilot pressure of the boom cylinder 3a, arm cylinder 3b, bucket cylinder 3d, swing cylinder 3e, and right travel motor 3g is inputted to the controller 150 through the pressure sensor 43, and a maximum operation pilot pressure of the boom cylinder 3a (only in the raising direction), arm cylinder 3b, swing motor 3c, blade cylinder 3h, and left travel motor 3f is inputted to the controller 150 through the pressure sensor 44, in the case where all operation levers are neutral, the gains N_gain1 and N_gain2 are kept at a minimum value (for example, 0%) by the gain tables 152a and 152b in the controller 150.

Further, an output from the reference rotational speed instruction dial 56 is converted into a reference rotational speed N_0 by the rotational speed instruction value table 154 and multiplied by the N_gain1 and N_gain2 by the multiplication sections 153a and 153b so as to be converted into target rotational speeds N1d and N2d and is further converted into an output Vinv1 to the inverters 160 and 260 and an output Vinv2 to the inverters 460 and 660 by the command value tables 155a and 155b. Therefore, when all operation levers are neutral, since N_gain1 and N_gain2 are kept at a minimum value (for example, 0%) as described hereinabove, both of the output Vinv1 to the inverters 160 and 260 and the output Vinv2 to the inverters 460 and 660 are kept at a minimum value.

Since Vinv1 and Vinv2 are kept at their minimum value, all of the electric motors 101, 201, 401, and 601 drive the main pumps 122, 222, 422, and 622 with a minimum rotational speed to supply hydraulic fluids.

Since the main pumps 122, 222, 422 and 622 are driven with a minimum rotational speed, also the flow rates of hydraulic fluids delivered from the main pumps are minimized.

Further, hydraulic fluids delivered from the main pumps 122 and 222 pass the hydraulic fluid supply lines 105a and 105b, respectively, and are merged in the hydraulic fluid supply line 307 and then supplied to the P1 port of the control valve block 104.

Since all operation levers are neutral, the hydraulic fluid supplied to the P1 port is discharged to the tank through the neutral circuits of the directional selector valves 16g, 16d, 16a, 16j, and 16e.

On the other hand, hydraulic fluids delivered from the main pumps 422 and 622 pass through the hydraulic fluid supply lines 205*a* and 205*b*, respectively, and are merged in the hydraulic fluid supply line 308 and then supplied to the P2 port of the control valve block 104.

Since all operation levers are neutral, the hydraulic fluid supplied to the P2 port is discharged to the tank through the neutral circuits in the directional selector valves 16*c*, 16*b*, 16*i*, 16*h*, and 16*f*.

<(a-2) Case where Boom Raising is Operated>

A case is considered in which the operation lever for the boom is inputted in a raising direction, namely, in a direction in which the boom cylinder 3*a* extends.

The pilot valve 60*a* for the boom operation is operated, and an operation pilot pressure is generated in a1.

Since the operation pilot pressure a1 is applied, both of the directional selector valves 16*a* and 16*i* for the boom select the rightward direction in the figure, and hydraulic fluids supplied from the main pumps 122 and 222 of the variable displacement type through the hydraulic fluid supply line 307 and hydraulic fluids supplied from the main pumps 422 and 622 of the variable displacement type through the hydraulic fluid supply line 308 are merged and supplied to the bottom side of the boom cylinder 3*a*.

On the other hand, the output pressure of the pilot valve 60*a* for the boom operation is introduced to the pressure sensor 43 through the shuttle valves 19*a*, 19*e*, 19*f*, 19*g*, and 19*h* and simultaneously introduced to the pressure sensor 44 through the shuttle valve 19*p*.

Output Vpc1 and Vpc2 of the pressure sensors 43 and 44 are introduced to the gain tables 152*a* and 152*b*, from which N_gain1 and N_gain2 are outputted in response to an output of the pilot valve 60*a* for the boom operation.

For example, in the case where the boom raising operation is a full operation, both of N_gain1 and N_gain2 become a maximum value 100%.

On the other hand, an output from the reference rotational speed instruction dial 56 to be converted into a reference rotational speed N_0 by the rotational speed instruction value table 154 is multiplied by the N_gain1 and N_gain2 described above by the multiplication sections 153*a* and 153*b* so as to be converted into target rotational speeds N1*d* and N2*d*, respectively, and are further converted into an output Vinv1 to the inverters 160 and 260 and an output Vinv2 to the inverters 460 and 660 by the command value tables 155*a* and 155*b*, respectively. Therefore, in the case where the boom raising operation is a full operation, since N_gain 1 and N_gain2 are kept at a maximum value (for example, 100%), both of the input Vinv1 to the inverters 160 and 260 and the output Vinv2 to the inverters 460 and 660 come to have a value same as that of an input from the reference rotational speed instruction dial 56.

Further, in the case where the boom raising operation is a half operation and N_gain1 and N_gain2 outputted from the gain tables 152*a* and 152*b* are 50%, since the target rotational speeds N1*d* and N2*d* become values obtained by multiplying the reference rotational speed N_0 from the reference rotational speed instruction dial 56 by 50%, N1*d*=N2*d*=N_0/2 is satisfied, and the electric motors 101, 201, 401, and 601 individually rotate at a rotational speed equal to one half the reference rotational speed N_0.

In the case where the boom raising operation is performed in this manner, as the output of the pilot valve 60*a* for the boom operation increases, the rotational speed of the electric motors 101, 201, 401, and 601 increases, and the extension speed of the boom cylinder 3*a* can be adjusted by the magnitude of the operation lever input.

Further, if it is assumed that the load pressure of the boom cylinder 3*a* upon boom raising is Pa_bmr, then upon a boom raising operation, both of the delivery pressures of the main pumps 122 and 222 and of the main pumps 422 and 622 become equal to the load pressure Pa_bmr of the boom cylinder 3*a*.

Here, in the case where the target current command values I1 and I2 of the proportional solenoid valves 20 and 21 are in the minimum, for example, 0, the horsepower control characteristic of the main pumps 122, 222, 422, and 622 of the variable displacement type becomes such as indicated by a solid line A2 in FIG. 17, and at the pump delivery pressure of Pa_bmr, the displacement of the main pumps 122 and 222 of the variable displacement type is limited to qqbmr1 and the displacement of the main pumps 422 and 622 of the variable displacement type is limited to qqbmr2.

In this manner, when the boom raising operation is performed, the main pumps 122, 222, 422, and 622 supply hydraulic fluids with displacements that depend upon respective horsepower control characteristics at a rotational speed according to a boom raising operation input.

(b) Case where the SOC of the Power Storage Device 170 is Greater than that of the Power Storage Device 270

A case is considered in which, the relationship between the charge state SOC1 of the power storage device 170 estimated by the first SOC estimation section 151*a* and the charge state SOC2 of the power storage device 270 estimated by the second SOC estimation section 151*b* is SOC1>SOC2.

Since SOC1>SOC2, ΔSOC computed by the differentiation section 151*c* becomes ΔSOC=SOC1−SOC2>0, namely, has a positive value, the current command value I1 for the proportional solenoid valve 20 becomes the minimum I1=0 and the current command value I2 for the proportional solenoid valve 21 has a value according to the characteristic of the table 151*e* depicted in FIG. 16. In the case ΔSOC>ΔSOC_0, the current command value I2 for the proportional solenoid valve 21 becomes I2=I_max.

Since the current command value I1 for the proportional solenoid valve 20 is 0, the main pumps 122 and 422 of the variable displacement type have a characteristic indicated by a solid line A2 of a) I1=0 in FIG. 17.

On the other hand, since the current command value I2 of the proportional solenoid valve 21 is I_max, the main pumps 222 and 622 of the variable displacement type have a characteristic indicated by a broken line C2 of c) I2=I_max in FIG. 17.

<(b-1) Case where all Operation Levers are Neutral>

In the case where all operation levers are neutral, similarly as in the case of (a) SOC1=SOC2 described above, all of the main pumps 122, 222, 422, and 622 of the variable displacement type deliver a minimum flow rate at a minimum rotational speed.

<(b-2) Case where Boom Raising is Operated>

Basic operation where the rotational speeds of the electric motors 101, 201, 401, and 601 for driving the main pumps 122, 222, 422, and 622 of the variable displacement type increases in response to an operation lever input amount for boom raising is similar to that in the case of (a) SOC1=SOC2 described hereinabove.

In the case where SOC1>SOC2 and ΔSOC (=SOC1−SOC2) is ΔSOC_0 as described above, the current command value I1 for the proportional solenoid valve 20 becomes the minimum value 0 and the main pumps 122 and 422 follow the characteristic of a) I1=0 in FIG. 17. Meanwhile, since the current command value I2 for the proportional solenoid valve 21 becomes I2=I_max, the main pumps 222 and 622 follow the characteristic indicated by the broken line C2 of c) I2=I_max.

If the pump load pressure upon boom raising operation is Pa_bmr, then the displacement of the main pumps 122 and 422 of the variable displacement type becomes qqbmr1 in FIG. 17.

On the other hand, the displacement of the main pumps 222 and 622 of the variable displacement type becomes qqbmr2_min, and qqbmr2_min<qqbmr1 is satisfied.

Although the rotational speeds of the electric motors 101 and 401 for driving the main pumps 122 and 422 of the variable displacement type and the electric motors 201 and 601 for driving the main pumps 422 and 622 of the variable displacement type depends only on the boom raising operation amount, since the displacement qq1 of the main pumps 122 and 422 of the variable displacement type and the displacement qq2 of the main pumps 222 and 622 of the variable displacement type have a difference therebetween as described above, the flow rates of hydraulic fluids delivered by the main pumps 222 and 622 of the variable displacement type are lower than the flow rates of hydraulic fluids delivered by the main pumps 122 and 422 of the variable displacement type.

Although the power consumption of a pump increases in proportion to the pressure×the flow rate and, upon boom raising operation, the pressures of the hydraulic fluid supply lines 105 and 205 are equal to each other, since the delivery flow rates of the main pumps 222 and 622 are lower than the delivery flow rates of the main pumps 122 and 422 as described hereinabove, the power consumption of the main pumps 222 and 622 is lower than the power consumption of the main pumps 122 and 422.

Therefore, the electric power consumption of the power storage device 270 from which electric power is supplied to the main pumps 222 and 622 is lower than the electric power consumption of the power storage device 170 from which electric power is supplied to the main pumps 122 and 422.

Since the electric power consumption of the power storage device 270 from which electric power is supplied to the main pump 202 is lower than the electric power consumption of the power storage device 170 from which electric power is supplied to the main pump 102, the rate at which the SOC2 of the power storage device 270 decreases is lower than the rate at which the SOC1 of the power storage device 170 decreases, and this continues until after the SOC1 and the SOC2 become equal to each other.

If SOC1=SOC2 is satisfied, then operation same as that in the case of (a) is performed.

(c) Case where the SOC of the Power Storage Device 270 is Greater than that of the Power Storage Device 170

Operation is substantially same as that of (b) except that, since SOC1>SOC2 changes to SOC1<SOC2, the relationship between the main pumps 122 and 422 and the main pumps 222 and 622 is reversed.

~Advantage~

Also with the present embodiment, advantages similar to those obtained by the first embodiment are obtained over the conventional hydraulic drive system of an open circuit including two pumps.

In particular, since the hydraulic drive system is configured such that, in addition to the main pumps 122 and 422, electric motors 101 and 401, and power storage device 170, the main pumps 222 and 622, electric motors 401 and 601, and power storage device 270 as well as the common hydraulic fluid supply line 307 in which hydraulic fluids delivered from the main pumps 122 and 222 are merged and the common hydraulic fluid supply line 308 in which hydraulic fluids delivered from the main pumps 422 and 622 are merged are provided and the merged hydraulic fluid is supplied to the plurality of directional selector valves (flow control valves) 16*a*, 16*d*, 16*e*, 16*g*, and 16*j* or the plurality of directional selector valves (flow control valves) 16*b*, 16*c*, 16*f*, 16*h*, and 16*i* and is further supplied to the plurality of actuators 3*a*, 3*b*, 3*c*, 3*d*, 3*e*, and 3*g* or the plurality of actuators 3*a*, 3*b*, 3*c*, 3*f*, and 3*h*, the rated voltage of various electric equipment such as power storage devices can be made common to that of an electrically-driven hydraulic work machine that is capable of being operated with lower horsepower.

Further, since the proportional solenoid valve target current calculation section 151 and the proportional solenoid valves 20 and 21 are provided and, in the case where the charge state of one of the power storage devices 170 and 270 becomes lower than the charge state of the other one of the power storage devices 170 and 270, the limit value q1*limit (q2*limit) of horsepower control of the main pumps 122 and 222 (or 422 and 622) is changed such that the charge state of the power storage device 170 and the charge state of the power storage device 270 become equal to each other thereby to suppress the power consumption of the hydraulic pump whose charge state is lower, even in the case where there is a difference in mechanical efficiency of the main pumps 122 and 222 or 422 and 622 and efficiency of electric equipment such as the inverters 160 and 260 or 460 and 660 or the step-up/step-down choppers 161 and 261, or even in the case where there is a difference between the electric power consumption amounts or the charge state characteristics of the power storage devices 170 and 270, the difference gradually decreases while the charge states of the power storage devices 170 and 270 are controlled so as to become equal to each other. Therefore, the power storage situation of one of the power storage devices 170 and 270 is prevented from being significantly degraded, and the period of time within which the actuators of the electrically-driven hydraulic work machine can obtain a predetermined speed can be extended.

It is to be noted that, also in the present embodiment, similarly as in the case of the first embodiment, only one of the first and second tables 151*d* and 151*e* (for example, the first table 151*d*) and a corresponding one of the proportional solenoid valves 20 and 21 (for example, the proportional solenoid valve 20) may be provided such that, only in the case where the charge state of one (for example, the power storage device 270) of the two power storage devices 170 and 270 becomes lower than the charge state of the other power storage device (for example, the power storage device 170), the limit value q1*limit (first allowable value) is changed such that the charge state of the power storage device 170 and the charge state of the power storage device 270) become equal to each other. Also this makes it possible to prevent that the charge state of one (for example, the power storage device 270) of the power storage devices 170 and 270 becomes significantly lower than the charge state of the other one (for example, the power storage device 170), and the period of time within which the actuators of the electrically-driven hydraulic work machine can obtain a predetermined speed can be extended.

DESCRIPTION OF REFERENCE CHARACTERS

3*a* to 3*h*: Actuator
4: Control valve block
6*a* to 6*h*: Flow control valve
7*a* to 7*h*: Pressure compensating valve
9*a* to 9*g*: Shuttle valve
14, 32: Relief valve 16a to 16j: Directional selector valve (flow control valve)
19a to 19p: Shuttle valve
20, 21: Proportional solenoid valve (horsepower distribution control section)
24: Gate lock lever
31: Hydraulic fluid supply line (pilot)
40, 41, 42: Pressure sensor
43, 44: Pressure sensor
50, 55: Controller
51: Virtual limitation torque calculation section (horsepower distribution control section)
51a: First SOC estimation section (first charge state estimation section)
51b: Second SOC estimation section (second charge state estimation section)
51c: Differentiation section (horsepower control amount calculation section)
51d: First table (horsepower control amount calculation section)
51e: Second table (horsepower control amount calculation section)
52, 53: Electric motor rotational speed control section
52r, 53r: Variable horsepower control table (first and second horsepower control devices; horsepower control section; first and second allowable value changing section)
52s, 53s: Minimum value selection section (first and second horsepower control devices)
52a to 52m: Table and other calculation factors (first flow control section)
53a to 53m: Table and other calculation factors (second flow control section)
56: Reference rotational speed instruction dial
80a to 80j: Check valve
100: Selector valve
101, 201: Electric motor (first and second electric motors)
102, 202: Main pump of the fixed displacement type (first and second hydraulic pumps)
104: Control valve block
105, 205: Hydraulic fluid supply line (main)
122, 422: Main pump of the variable displacement type (first hydraulic pumps)
122a, 222a, 422a, 622a: Regulator piston (first and second horsepower control devices)
130, 230, 30: Pilot pump of the variable displacement type
133, 233, 180, 280: Check valve
150: Controller
151: Proportional solenoid valve target current calculation section (horsepower distribution control section)
152a, 152b to 155a, 155b: Table and multiplication section (first and second flow control sections)
160, 260, 360: Inverter
161, 261, 361: Step-up/step-down chopper
170, 270: Power storage device (first and second power storage devices)
171, 271: Battery management system (BMS)
180, 280: Check valve (first and second check valves)
222, 622: Main pump of the variable displacement type (second hydraulic pump)
301: Electric motor (third electric motor)
305, 307, 308: Common hydraulic fluid supply line
401, 601: Electric motor (first and second electric motors)
460, 660: Inverter

The invention claimed is:

1. A hydraulic drive system for an electrically-driven hydraulic work machine including a first hydraulic pump, a plurality of actuators driven by hydraulic fluid supplied from the first hydraulic pump, a plurality of flow control valves that control directions and flow rates of the hydraulic fluids to be supplied to the plurality of actuators, a first electric motor that drives the first hydraulic pump, a first power storage device that supplies electric power to the first electric motor, and a first horsepower control device configured to decrease, when a delivery pressure of the first hydraulic pump increases, a delivery flow rate of the first hydraulic pump to control an absorption horsepower of the first hydraulic pump so as not to exceed a first allowable value,
the hydraulic drive system comprising:
a second hydraulic pump;
a common hydraulic fluid supply line in which hydraulic fluids delivered from the first and second hydraulic pumps are merged and are supplied to the plurality of flow control valves;
a second electric motor that drives the second hydraulic pump;
a second power storage device that supplies electric power to the second electric motor;
a second horsepower control device configured to decrease, when a delivery pressure of the second hydraulic pump increases, a delivery flow rate of the second hydraulic pump to control an absorption horsepower of the second hydraulic pump so as not to exceed a second allowable value; and
a controller including a horsepower distribution control section configured to change at least one of the first and second allowable values of the first and second horsepower control devices such that a charge state of the first power storage device and a charge state of the second power storage device become equal to each other.

2. The hydraulic drive system for an electrically-driven hydraulic work machine according to claim 1, wherein
each of the first and second hydraulic pumps is a hydraulic pump of fixed displacement type, and
the first and second horsepower control devices configured to control rotational speeds of the first and second hydraulic pump respectively to control the absorption horsepowers of the first and second hydraulic pumps such that the absorption horsepower of the first hydraulic pump does not exceed the first allowable value and the absorption horsepower of the second hydraulic pump does not exceed the second allowable value.

3. The hydraulic drive system for an electrically-driven hydraulic work machine according to claim 1, wherein
each of the first and second hydraulic pumps is a hydraulic pump of variable displacement type, and
the first and second horsepower control devices are configured to control displacements of the first and second hydraulic pump respectively to control the absorption horsepowers of the first and second hydraulic pumps such that the absorption horsepower of the first hydraulic pump does not exceed the first allowable value and the absorption horsepower of the second hydraulic pump does not exceed the second allowable value.

4. The hydraulic drive system for an electrically-driven hydraulic work machine according to claim 1, further comprising:
a plurality of operation devices that command operations of the plurality of actuators, wherein
the controller further includes
a first flow control section configured to perform, when at least one of the plurality of operation devices is operated, load sensing control for controlling a delivery flow rate of the first hydraulic pump such that the delivery pressure of the first hydraulic pump becomes higher by a target differential pressure than a highest load pressure of the plurality actuators, and a second flow control section configured to perform, when at least one of the plurality of operation devices is operated, load sensing control for controlling a delivery flow rate of the second hydraulic pump such that the delivery pressure of the second hydraulic pump becomes higher by the target differential pressure than the highest load pressure of the plurality of actuators, the first and second flow control sections are configured to control rotational speeds of the first and second hydraulic pumps respectively to control the delivery flow rates of the first and second hydraulic pumps such that the delivery pressures of the first and second hydraulic pumps become higher by the target differential pressure than the highest load pressure of the plurality of actuators, and the first and second horsepower control devices are configured to control the delivery flow rates of the first and second hydraulic pumps respectively, which are controlled by the load sensing control, such that the absorption horsepower of the first hydraulic pump does not exceed the first allowable value and the absorption horsepower of the second hydraulic pump does not exceed the second allowable value.

5. The hydraulic drive system for an electrically-driven hydraulic work machine according to claim 1, further comprising:

a plurality of operation devices that command operations of the plurality of actuators, wherein the controller further includes a first flow control section configured to perform, when at least one of the plurality of operation devices is operated, positive flow control for controlling a delivery flow rate of the first hydraulic pump as a required flow rate by the operation device increases, and a second flow control section configured to perform, when at least one of the plurality of operation devices is operated, positive flow control for controlling a delivery flow rate of the second hydraulic pump as a required flow rate by the operation device increases, the first and second flow control sections are configured to control rotational speeds of the first and second hydraulic pumps respectively to control the delivery flow rates of the first and second hydraulic pumps as the required flow rate increases, and the first and second horsepower control devices are configured to control the delivery flow rates of the first and second hydraulic pumps respectively, which are controlled by the positive flow control, such that the absorption horsepower of the first hydraulic pump does not exceed the first allowable value and the absorption horsepower of the second hydraulic pump does not exceed the second allowable value.

6. The hydraulic drive system for an electrically-driven hydraulic work machine according to claim 1, wherein the horsepower distribution control section of the controller includes a first charge state estimation section configured to estimate a charge state of the first power storage device, a second charge state estimation section configured to estimate a charge state of the second power storage device, a horsepower control amount calculation section configured to calculate, when the charge state of the first power storage device estimated by the first charge state estimation section is lower than the charge state of the second power storage device estimated by the second charge state estimation section, a first horsepower control amount for decreasing the absorption power of the first hydraulic pump and calculate, when the charge state of the second power storage device estimated by the second charge state estimation section is lower than the charge state of the first power storage device estimated by the first charge state estimation section, a second horsepower control amount for decreasing the absorption power of the second hydraulic pump, a first allowable value changing section configured to change the first allowable value for the first horsepower control device on the basis of the first horsepower control amount calculated by the horsepower control amount calculation section, and a second allowable value changing section configured to change the second allowable value for the second horsepower control device on the basis of the second horsepower control amount calculated by the horsepower control amount calculation section.

7. The hydraulic drive system for an electrically-driven hydraulic work machine according to claim 1, further comprising:

a first hydraulic fluid supply line that introduces the hydraulic fluid from the first hydraulic pump to the common hydraulic fluid supply line;

a second hydraulic fluid supply line that introduces the hydraulic fluid from the second hydraulic pump to the common hydraulic fluid supply line;

a first check valve provided in the first hydraulic fluid supply line to block a flow of the hydraulic fluid from the common hydraulic fluid supply line to the first hydraulic pump; and a second check valve provided in the second hydraulic fluid supply line for blocking a flow of the hydraulic fluid from the common hydraulic fluid supply line to the second hydraulic pump.

8. The hydraulic drive system for an electrically-driven hydraulic work machine according to claim 1, further comprising:

a pilot pump of fixed displacement type that generates a pilot primary pressure as a primary pressure for a plurality of operation devices that command operation of the plurality of actuators;

a third electric motor to which electric power is supplied from one of the first and second power storage device to drive the pilot pump; and a pilot pump control device including a controller configured to control a rotational speed of the third electric motor such that the pilot primary pressure generated by the pilot pump becomes equal to a target pressure.

* * * * *